US011167779B2

(12) United States Patent
Cook

(10) Patent No.: US 11,167,779 B2
(45) Date of Patent: Nov. 9, 2021

(54) FOLDING DOLLY SYSTEM AND METHODS FOR ASSEMBLING AND UTILIZING A DOLLY SYSTEM

(71) Applicant: The Boeing Company, Chicago, IL (US)

(72) Inventor: Rebecca L. Cook, Charleston, SC (US)

(73) Assignee: The Boeing Company, Chicago, IL (US)

( * ) Notice: Subject to any disclaimer, the term of this patent is extended or adjusted under 35 U.S.C. 154(b) by 62 days.

(21) Appl. No.: 16/719,546

(22) Filed: Dec. 18, 2019

(65) Prior Publication Data

US 2021/0188337 A1 Jun. 24, 2021

(51) Int. Cl.
*B62B 3/02* (2006.01)
*B62B 3/00* (2006.01)
*B62B 5/00* (2006.01)
*B62B 5/06* (2006.01)

(52) U.S. Cl.
CPC .............. *B62B 3/022* (2013.01); *B62B 3/008* (2013.01); *B62B 5/0079* (2013.01); *B62B 5/06* (2013.01); *B62B 2205/26* (2013.01)

(58) Field of Classification Search
CPC .................................. B62B 3/02; B62B 5/0079
See application file for complete search history.

(56) References Cited

U.S. PATENT DOCUMENTS

| | | | | |
|---|---|---|---|---|
| 1,423,084 A * | 7/1922 | Cotton | ..................... | B60D 1/54 280/478.1 |
| 5,829,765 A * | 11/1998 | Snider | ................... | B62B 5/0083 280/42 |
| 6,095,348 A * | 8/2000 | Karashima | .............. | A47F 5/103 211/175 |
| 6,209,716 B1 * | 4/2001 | Bogle | ................... | B65G 17/086 198/852 |
| 6,550,794 B1 * | 4/2003 | Spindel | ..................... | B60D 1/00 280/33.993 |
| 8,215,662 B2 * | 7/2012 | Koehler | ................... | B62B 3/008 280/656 |
| 8,523,197 B2 * | 9/2013 | Baatz | ..................... | A47B 31/04 280/42 |
| 8,876,145 B1 * | 11/2014 | Bernal | .................. | B62B 5/0093 280/638 |
| 9,010,798 B2 * | 4/2015 | Buttazzoni | ................ | B62B 3/00 280/638 |
| 9,409,585 B2 | 8/2016 | Buttazzoni et al. | | |
| 9,988,062 B2 * | 6/2018 | Stahl | ....................... | B62B 3/008 |
| 10,577,150 B2 * | 3/2020 | Millhouse | .............. | B65D 19/44 |
| 2004/0195803 A1 * | 10/2004 | Brown | ................... | B60D 1/481 280/504 |
| 2006/0053725 A1 * | 3/2006 | Su | ............................ | B60D 1/00 52/590.1 |

(Continued)

*Primary Examiner* — Erez Gurari
(74) *Attorney, Agent, or Firm* — Yee & Associates, P.C.

(57) ABSTRACT

A folding dolly system, a base unit of a folding dolly system, and methods of forming and using a folding dolly system are presented. A folding dolly system comprises a plurality of interconnectable base units connected to form a substantially planar holding surface, each base unit comprising a first edge with a number of knuckles configured to form a joint, a second edge with a number of knuckles configured to form a joint, and a surface forming a portion of the holding surface.

23 Claims, 22 Drawing Sheets

(56) References Cited

U.S. PATENT DOCUMENTS

| | | | |
|---|---|---|---|
| 2009/0085315 A1* | 4/2009 | Meers | B62B 3/16 |
| | | | 280/33.992 |
| 2010/0243012 A1* | 9/2010 | Lindeman | B62B 3/02 |
| | | | 135/88.02 |
| 2012/0267869 A1* | 10/2012 | Hassell | B62B 3/02 |
| | | | 280/79.11 |
| 2013/0341880 A1* | 12/2013 | Bernal | B60B 33/00 |
| | | | 280/79.11 |
| 2013/0341890 A1* | 12/2013 | Buttazzoni | B62B 5/0083 |
| | | | 280/651 |
| 2014/0360120 A1* | 12/2014 | Brisendine | E04F 15/02405 |
| | | | 52/582.1 |
| 2015/0353113 A1* | 12/2015 | Buttazzoni | B62B 5/0093 |
| | | | 280/79.11 |
| 2016/0137011 A1* | 5/2016 | Kao | B62B 3/00 |
| | | | 280/412 |
| 2016/0325882 A1* | 11/2016 | Christie | B65D 19/42 |
| 2017/0151973 A1 | 6/2017 | Buttazzoni et al. | |
| 2019/0193494 A1* | 6/2019 | Newman | B60D 1/065 |
| 2019/0193495 A1* | 6/2019 | Floyd | B60D 1/04 |
| 2020/0101994 A1* | 4/2020 | Eckerley | B62B 3/02 |

\* cited by examiner

FOLDING DOLLY SYSTEM AND METHODS FOR ASSEMBLING AND UTILIZING A DOLLY SYSTEM

BACKGROUND INFORMATION

1. Field

The present disclosure relates generally to transporting goods, and more specifically to a folding dolly system formed of a plurality of interconnectable base units.

2. Background

In factories and other workplaces, material transport devices are provided for transporting large, heavy, or bulky items. Material transport devices include hand trucks, carts, and dollies, and may be expensive and large. Due to at least one of the size or expense of material transport devices, the quantity of material transport devices within a workplace may be limited.

Employees may have difficulty locating material transport devices when needed. Sometimes, the material transport devices may be undesirably far from the location of the item to be transported. Rather than spend time locating or traveling to a material transport device, employees often will pick up and carry things much larger and heavier than what is ergonomic.

Therefore, it would be desirable to have a method and apparatus that takes into account at least some of the issues discussed above, as well as other possible issues. For example, it is desirable to provide a material transport device that is at least one of less expensive or smaller than existing carts.

SUMMARY

An embodiment of the present disclosure provides a folding dolly system. The folding dolly system comprises a plurality of interconnectable base units connected to form a substantially planar holding surface, each base unit comprising a first edge with a number of knuckles configured to form a joint, a second edge with a number of knuckles configured to form a joint, and a surface forming a portion of the holding surface.

Another embodiment of the present disclosure provides a method. A connector is sent through a number of knuckles of a first edge of a base unit to form a joint of a folding dolly system comprising a plurality of interconnectable base units including the base unit. Sending the connector through the number of knuckles joins a surface of the base unit to surfaces of remaining base units of the plurality of interconnectable base units to form a holding surface of the folding dolly system.

Another embodiment of the present disclosure provides a base unit for a folding dolly system. The base unit comprises a first edge having a number of knuckles for forming a joint, a second edge having a number of knuckles for forming a joint, and a surface between the first edge and the second edge, the surface is substantially planar.

Yet another embodiment of the present disclosure provides a method. A plurality of interconnectable base units is connected to form a folding dolly system having a holding surface formed by a respective surface of each of the plurality of interconnectable base units.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that if a large cart is borrowed, often it must be returned a great distance to the owner which is often also a deterrent to using a material transport device. The illustrative examples recognize and take into account that it would be desirable to provide a material transport device that can be stored for personal use.

The illustrative examples recognize and take into account that some occupations involve travel and transportation of display items or other items. For example, salesmen or lecturers may have signage, samples, pamphlets, or other items while traveling to conferences. The illustrative examples recognize and take into account that it would be desirable to provide a material transport device that is designed to be easily transported during travel.

The illustrative examples recognize and take into account that different sized carts may be used to transport different sizes of items. Storing several different sizes of cart may use an undesirable amount of storage space. The illustrative examples recognize and take into account that it would be desirable to have a material transport device that may be adjusted to accommodate different sizes of items.

The illustrative examples provide a folding dolly system. The folding dolly system comprises a plurality of interconnectable base units connected to form a substantially planar holding surface, each base unit comprising a first edge with a number of knuckles configured to form a joint, a second edge with a number of knuckles configured to form a joint, and a surface forming a portion of the holding surface.

Figure 1A:
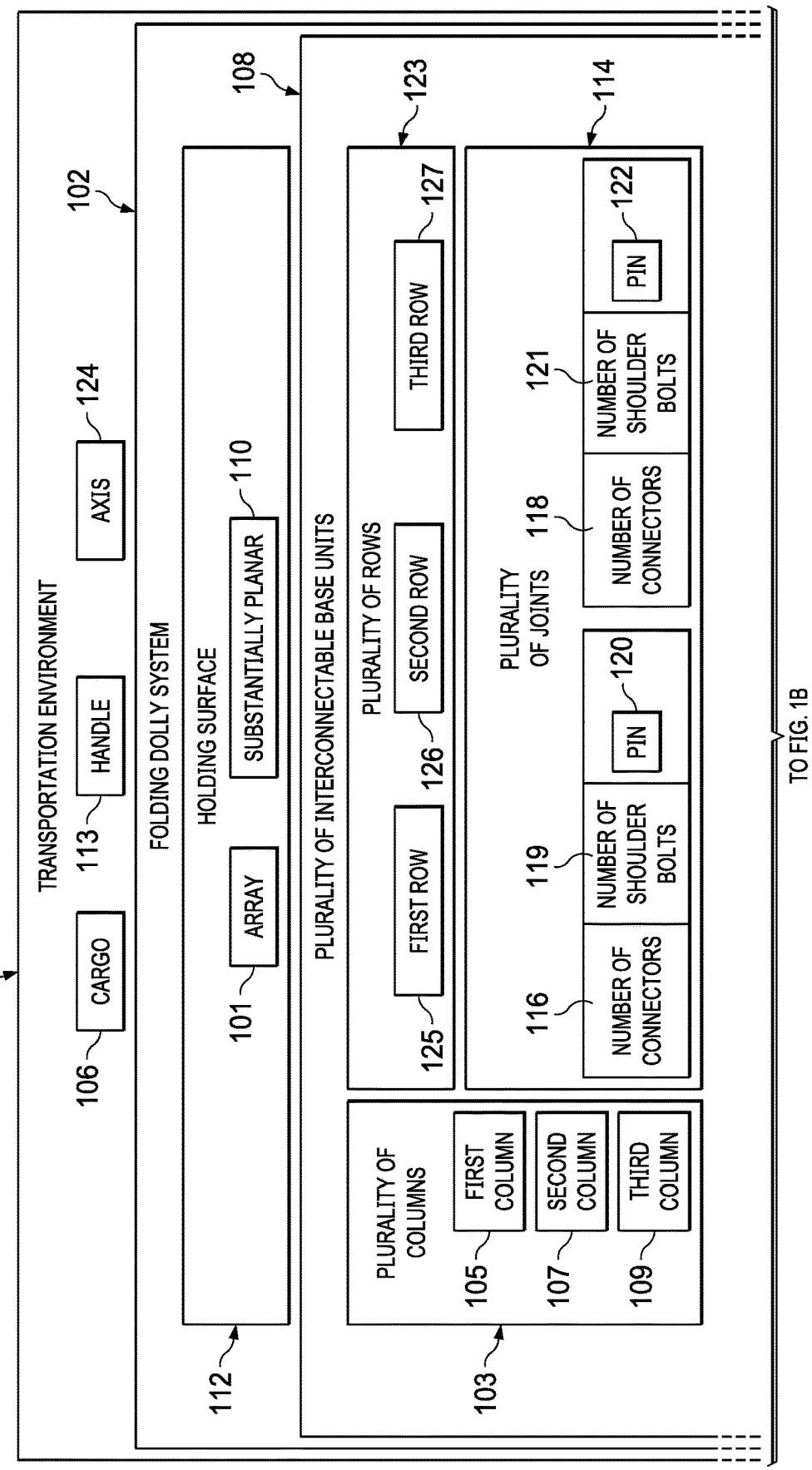
FIGS. 1A and 1B are an illustration of a block diagram of a transportation environment in which an illustrative embodiment may be implemented.
Figure 1B:
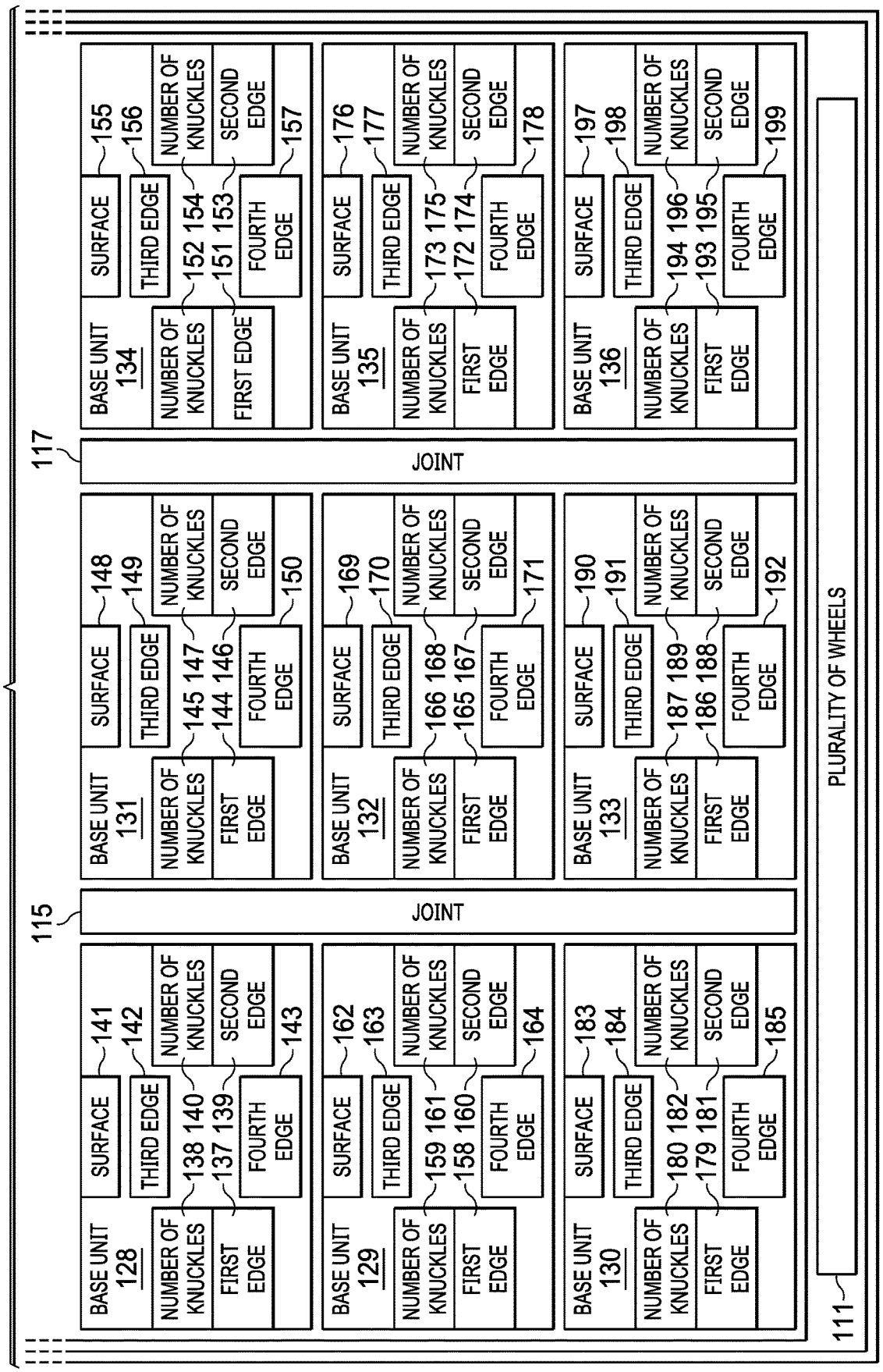

Turning now to FIGS. 1A and 1B, an illustration of a block diagram of a transportation environment is depicted in which an illustrative embodiment may be implemented. Transportation environment 100 includes folding dolly system 102. Folding dolly system 102 is configured to move cargo 106 within transportation environment 100.

Folding dolly system 102 comprises plurality of interconnectable base units 108 connected to form substantially planar 110 holding surface 112.

Plurality of interconnectable base units 108 is connected by plurality of joints 114. Each joint of plurality of joints 114 is formed by a number of connectors. For example, joint 115 of plurality of joints 114 is formed by number of connectors 116. Joint 117 of plurality of joints 114 is formed by number of connectors 118. Number of connectors 116 comprises at least one of number of shoulder bolts 119 or pin 120. Number of connectors 118 comprises at least one of number of shoulder bolts 121 or pin 122.

Folding dolly system 102 is configured to fold into plurality of rows 123 around axis 124. Plurality of rows 123 comprises a plurality of surfaces wrapping about axis 124 by means of folding/rolling action. Plurality of rows 123 may be referred to as "planes" or "planar surfaces" spiraling about axis 124.

Plurality of rows 123 is connected by plurality of joints 114. As depicted plurality of rows 123 comprises first row 125, second row 126, and third row 127. However, folding dolly system 102 comprises any desirable quantity of rows.

Each row of plurality of rows 123 comprises a number of base units of plurality of interconnectable base units 108. As depicted, each row of plurality of rows 123 comprises three base units. First row 125 includes base unit 128, base unit 129, and base unit 130. Second row 126 includes base unit 131, base unit 132, and base unit 133. Third row 127 includes base unit 134, base unit 135, and base unit 136.

Joint 115 connects first row 125 and second row 126. Joint 117 connects second row 126 and third row 127.

Connecting plurality of interconnectable base units 108 comprises sending number of connectors 116 through knuckles of a first number of base units to form a first joint, joint 115. As depicted, number of connectors 116 is sent through knuckles of the first number of base units including base unit 128, base unit 129, base unit 130, base unit 131, base unit 132, and base unit 133. Number of connectors 116 is sent through number of knuckles 140, number of knuckles 161, number of knuckles 182, number of knuckles 145, number of knuckles 166, and number of knuckles 187.

Connecting plurality of interconnectable base units 108 comprises sending a number of connectors through knuckles of a second number of base units to form a second joint, joint 117. As depicted, number of connectors 118 is sent through knuckles of the second number of base units including base unit 131, base unit 132, base unit 133, base unit 134, base unit 135, and base unit 136. Number of connectors 118 is sent through number of knuckles 147, number of knuckles 168, number of knuckles 189, number of knuckles 152, number of knuckles 173, and number of knuckles 194.

As can be seen, base unit 131, base unit 132, and base unit 133 are described as being in the first number of base units and the second number of base units. Although the terms first number and second number are used, these terms do not limit the relationship between these groups of base units, the quantity of base units in each group, or the order in which the base units are connected.

In other non-depicted illustrative examples, the first joint and the second joint are not separated by single row of base units. In some illustrative examples, the first joint and the second joint are separated by more than one row of base units. In some non-depicted illustrative examples, the first number of base units and the second number of base units do not overlap. In these non-depicted illustrative examples, the first number of base units and the second number of base units do not have any base units in common. In some illustrative examples, the first number of base units has more than six base units. In some illustrative examples, the first number of base units has fewer than six base units.

Each base unit comprises a first edge with a number of knuckles configured to form a joint, a second edge with a number of knuckles configured to form a joint, and a surface forming a portion of holding surface 112. Base unit 128 comprises first edge 137 with number of knuckles 138 configured to form a joint, second edge 139 with number of knuckles 140 configured to form joint 115, and surface 141 forming a portion of holding surface 112. First edge 137 is opposite second edge 139 across surface 141.

Each of the first edge and the second edge of each base unit is configured to react against a respective first edge or second edge of an adjacent base unit to form the holding surface to be substantially planar. First edge 137 and second edge 139 of base unit 128 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112.

Each base unit of plurality of interconnectable base units 108 comprises a third edge and a fourth edge. Each third edge is opposite fourth edge across surface 141. Each third edge and each fourth edge of a respective base unit are substantially perpendicular to the surface of the respective base unit. In some illustrative examples, each third edge and each fourth edge of a respective base unit are each substantially planar. In some illustrative examples, each third edge and each fourth edge have a respective connector to join to a third edge or a fourth edge of an adjacent base unit.

Base unit 128 has third edge 142 and fourth edge 143. Third edge 142 is opposite fourth edge 143 across surface 141. For example, third edge 142 forms a side of surface 141 opposite a side of surface 141 formed by fourth edge 143.

Base unit 131 comprises first edge 144 with number of knuckles 145 configured to form joint 115, second edge 146 with number of knuckles 147 configured to form joint 117, and surface 148 forming a portion of holding surface 112. First edge 144 is opposite second edge 146 across surface 148.

Each of first edge 144 and second edge 146 of base unit 131 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 144 is configured to react against second edge 139 to maintain holding surface 112 as substantially planar 110. Second edge 139 is configured to react against first edge 144 to maintain holding surface 112 as substantially planar 110.

Base unit 131 has third edge 149 and fourth edge 150. Third edge 149 is opposite fourth edge 150 across surface 148. For example, third edge 149 forms a side of surface 148 opposite a side of surface 148 formed by fourth edge 150.

Base unit 134 comprises first edge 151 with number of knuckles 152 configured to form joint 117, second edge 153 with number of knuckles 154 configured to form a joint, and surface 155 forming a portion of holding surface 112. First edge 151 is opposite second edge 153 across surface 155.

Each of first edge 151 and second edge 153 of base unit 134 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 151 is configured to react against second edge 146 to maintain holding surface 112 as substantially planar 110. Second edge 153 is configured to react against a first edge to maintain holding surface 112 as substantially planar 110 when a fourth row is present.

Base unit 134 has third edge 156 and fourth edge 157. Third edge 156 is opposite fourth edge 157 across surface 155. For example, third edge 156 forms a side of surface 155 opposite a side of surface 155 formed by fourth edge 157.

Base unit 128, base unit 131, and base unit 134 form first column 105 of plurality of columns 103. Fourth edge 143, fourth edge 150, and fourth edge 157 form an edge of first column 105 in contact with second column 107. In some illustrative examples, fourth edge 143, fourth edge 150, and fourth edge 157 are substantially planar. In some other illustrative examples, fourth edge 143, fourth edge 150, and fourth edge 157 each have a connector to interface with base unit 129, base unit 132, and base unit 135 respectively. When folding dolly system 102 is rolled around axis 124 to place folding dolly system 102 into a stored position, base unit 128, base unit 131, and base unit 134 move relative to each other about joint 115 and joint 117.

Second column 107 includes base unit 129, base unit 132, and base unit 135. Base unit 129 comprises first edge 158 with number of knuckles 159 configured to form a joint, second edge 160 with number of knuckles 161 configured to form joint 115, and surface 162 forming a portion of holding surface 112. First edge 158 is opposite second edge 160 across surface 162.

Each of first edge 158 and second edge 160 of base unit 129 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 158 is configured to react against a second edge to maintain holding surface 112 as substantially planar 110. Second edge 160 is configured to react against first edge 165 to maintain holding surface 112 as substantially planar 110.

Base unit 129 has third edge 163 and fourth edge 164. Third edge 163 is opposite fourth edge 164 across surface 162. For example, third edge 163 forms a side of surface 162 opposite a side of surface 162 formed by fourth edge 164.

Base unit 132 comprises first edge 165 with number of knuckles 166 configured to form joint 115, second edge 167 with number of knuckles 168 configured to form joint 117, and surface 169 forming a portion of holding surface 112. First edge 165 is opposite second edge 167 across surface 169.

Each of first edge 165 and second edge 167 of base unit 132 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 165 is configured to react against second edge 160 to maintain holding surface 112 as substantially planar 110. Second edge 167 is configured to react against first edge 172 to maintain holding surface 112 as substantially planar 110.

Base unit 132 has third edge 170 and fourth edge 171. Third edge 170 is opposite fourth edge 171 across surface 169. For example, third edge 170 forms a side of surface 169 opposite a side of surface 169 formed by fourth edge 171.

Base unit 135 comprises first edge 172 with number of knuckles 173 configured to form joint 117, second edge 174 with number of knuckles 175 configured to form a joint, and surface 176 forming a portion of holding surface 112. First edge 172 is opposite second edge 174 across surface 176.

Each of first edge 172 and second edge 174 of base unit 135 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 172 is configured to react against second edge 167 to maintain holding surface 112 as substantially planar 110. Second edge 174 is configured to react against a first edge to maintain holding surface 112 as substantially planar 110 when a fourth row is present.

Base unit 135 has third edge 177 and fourth edge 178. Third edge 177 is opposite fourth edge 178 across surface 176. For example, third edge 177 forms a side of surface 176 opposite a side of surface 176 formed by fourth edge 178.

Base unit 129, base unit 132, and base unit 135 form second column 107 of plurality of columns 103. Third edge 163, third edge 170, and third edge 177 form an edge of second column 107 in contact with first column 105. In some other illustrative examples, third edge 163, third edge 170, and third edge 177 are substantially planar. In some other illustrative examples, third edge 163, third edge 170, and third edge 177 each have a connector to interface with base unit 129, base unit 132, and base unit 135 respectively. When folding dolly system 102 is rolled around axis 124 to place folding dolly system 102 into a stored position, base unit 129, base unit 132, and base unit 135 move relative to each other about joint 115 and joint 117.

Fourth edge 164, fourth edge 171, and fourth edge 178 form an edge of second column 107 in contact with third column 109. In some illustrative examples, fourth edge 164, fourth edge 171, and fourth edge 178 are substantially planar. In some other illustrative examples, fourth edge 164, fourth edge 171, and fourth edge 178 each have a connector to interface with base unit 130, base unit 133, and base unit 136 respectively. When folding dolly system 102 is rolled around axis 124 to place folding dolly system 102 into a stored position, base unit 130, base unit 133, and base unit 136 move relative to each other about joint 115 and joint 117.

Third column 109 includes base unit 130, base unit 133, and base unit 136. Base unit 130 comprises first edge 179 with number of knuckles 180 configured to form a joint, second edge 181 with number of knuckles 182 configured to form joint 115, and surface 183 forming a portion of holding surface 112. First edge 179 is opposite second edge 181 across surface 183.

Each of first edge 179 and second edge 181 of base unit 130 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 179 is configured to react against a second edge to maintain holding surface 112 as substantially planar 110. Second edge 181 is configured to react against first edge 186 to maintain holding surface 112 as substantially planar 110.

Base unit 130 has third edge 184 and fourth edge 185. Third edge 184 is opposite fourth edge 185 across surface 183. For example, third edge 184 forms a side of surface 183 opposite a side of surface 183 formed by fourth edge 185.

Base unit 133 comprises first edge 186 with number of knuckles 187 configured to form joint 115, second edge 188 with number of knuckles 189 configured to form joint 117, and surface 190 forming a portion of holding surface 112. First edge 186 is opposite second edge 188 across surface 190.

Each of first edge 186 and second edge 188 of base unit 133 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 186 is configured to react against second edge 181 to maintain holding surface 112 as substantially planar 110. Second edge 188 is configured to react against first edge 193 to maintain holding surface 112 as substantially planar 110.

Base unit 133 has third edge 191 and fourth edge 192. Third edge 191 is opposite fourth edge 192 across surface 190. For example, third edge 191 forms a side of surface 190 opposite a side of surface 190 formed by fourth edge 192.

Base unit 136 comprises first edge 193 with number of knuckles 194 configured to form joint 117, second edge 195 with number of knuckles 196 configured to form a joint, and surface 197 forming a portion of holding surface 112. First edge 193 is opposite second edge 195 across surface 197.

Each of first edge 193 and second edge 195 of base unit 136 is configured to react against a respective first edge or second edge of an adjacent base unit to form holding surface 112 to be substantially planar 110. By reacting against a respective first edge or second edge of an adjacent base unit, holding surface 112 is maintained as substantially planar 110 when cargo 106 is placed on holding surface 112. For example, first edge 193 is configured to react against second edge 188 to maintain holding surface 112 as substantially planar 110. Second edge 195 is configured to react against a first edge to maintain holding surface 112 as substantially planar 110 when a fourth row is present.

Base unit 136 has third edge 198 and fourth edge 199. Third edge 198 is opposite fourth edge 199 across surface 197. For example, third edge 198 forms a side of surface 197 opposite a side of surface 197 formed by fourth edge 199.

Base unit 130, base unit 133, and base unit 136 form third column 109 of plurality of columns 103. Third edge 184, third edge 191, and third edge 198 form an edge of third column 109 in contact with second column 107. In some other illustrative examples, third edge 184, third edge 191, and third edge 198 are substantially planar. In some other illustrative examples, third edge 184, third edge 191, and third edge 198 each have a connector to interface with base unit 130, base unit 133, and base unit 136 respectively. When folding dolly system 102 is rolled around axis 124 to place folding dolly system 102 into a stored position, base unit 130, base unit 133, and base unit 136 move relative to each other about joint 115 and joint 117.

Holding surface 112 is formed by array 101 of plurality of interconnectable base units 108. Array 101 includes plurality of rows 123 and plurality of columns 103. A size and shape of holding surface 112 is adjustable by changing array 101. For example, third row 127 can be removed from folding dolly system 102 to change a size and shape of holding surface 112. As another example, additional base units can be added to form at least one of a fourth row or a fourth column.

Folding dolly system 102 further comprises plurality of wheels 111. Each wheel of plurality of wheels 111 is connected to a respective base unit of plurality of interconnectable base units 108. In some illustrative examples, plurality of wheels 111 comprises a quantity of wheels equivalent to a quantity of base units in plurality of interconnectable base units 108. In these illustrative examples, each base unit of plurality of interconnectable base units 108 is connected to a wheel of plurality of wheels 111. In some illustrative examples, each base unit of plurality of interconnectable base units 108 has a same design and each wheel of plurality of wheels 111 is connected to a same location of a base unit.

In some illustrative examples, plurality of interconnectable base units 108 has a quantity of base units greater than a quantity of wheels in plurality of wheels 111. In these illustrative examples, some base units of plurality of interconnectable base units 108 are not connected to a wheel of plurality of wheels 111.

In some illustrative examples, plurality of wheels 111 is mounted on small bearings. The bearings provide a smooth rolling action for plurality of wheels 111. In some illustrative examples, plurality of wheels 111 is a plurality of low-profile wheels.

Folding dolly system 102 is propelled on plurality of wheels 111 by any desirable method. In some illustrative examples, folding dolly system 102 is propelled by pulling plurality of interconnectable base units 108 by handle 113. Handle 113 takes any desirable form. In some illustrative examples, handle 113 comprises a rigid stem and handle. In some illustrative examples, handle 113 comprises a flexible component such as a cord, tube, or other flexible component. In some illustrative examples, handle 113 further acts as a securing strap. When handle 113 acts as a securing strap, handle 113 is wrapped around plurality of interconnectable base units 108 to maintain folding dolly system 102 in a stored position.

When present, handle 113 is secured to components of folding dolly system 102 in any desirable fashion. In some illustrative examples, handle 113 is attached to folding dolly system 102 using at least one of number of knuckles 138, number of knuckles 159, or number of knuckles 180.

The illustration of transportation environment 100 in FIGS. 1A and 1B is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, folding dolly system 102 has any desirable quantity of rows in plurality of rows 123. As another example, folding dolly system 102 has any desirable quantity of columns in plurality of columns 103. As another example, number of connectors 116 can include more than one pin.

Figure 2:
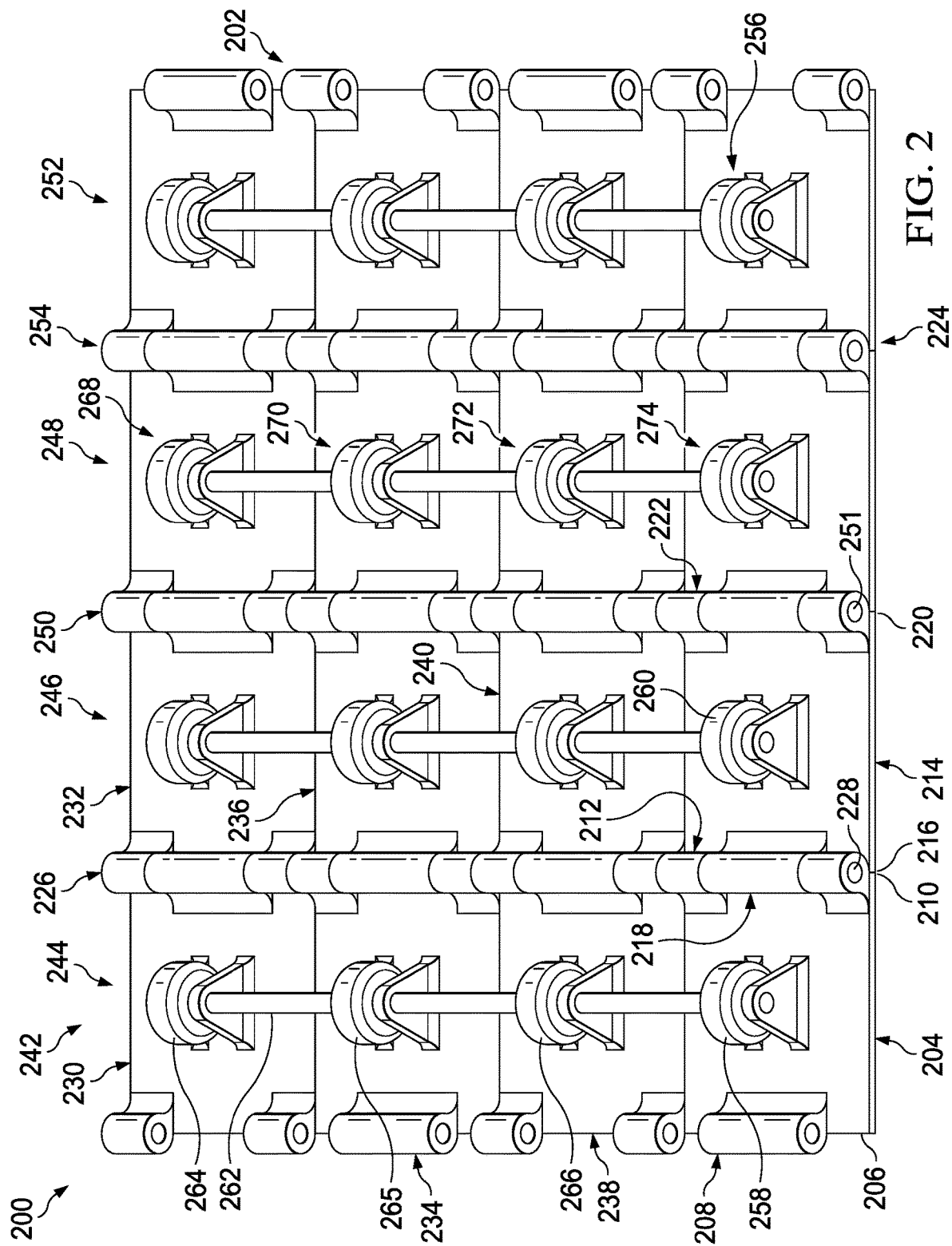
FIG. 2 is an illustration of a bottom view of a folding dolly system in accordance with an illustrative embodiment.

Turning now to FIG. 2, an illustration of a bottom view of a folding dolly system is depicted in accordance with an illustrative embodiment. Folding dolly system 200 is a physical implementation of folding dolly system 102 of FIG. 1. Folding dolly system 200 comprises plurality of interconnectable base units 202 connected to form a substantially planar holding surface. Each base unit of plurality of interconnectable base units 202 comprises a first edge with a number of knuckles configured to form a joint, a second edge with a number of knuckles configured to form a joint, and a surface forming a portion of the holding surface.

For example, base unit 204 comprises first edge 206 with number of knuckles 208, second edge 210 with number of knuckles 212, and a surface (not depicted). As another example, base unit 214 comprises first edge 216 with number of knuckles 218, second edge 220 with number of knuckles 222, and a surface (not depicted).

Plurality of interconnectable base units 202 is connected by plurality of joints 224. Each joint of plurality of joints 224 is formed by a number of connectors. The number of connectors comprises at least one of a number of shoulder bolts or a pin. For example, joint 226 is formed by pin 228. Pin 228 extends through knuckles of each of base unit 230, base unit 232, base unit 234, base unit 236, base unit 238, base unit 240, base unit 204, and base unit 214.

Connecting plurality of interconnectable base units 202 comprises sending a number of connectors through knuckles of a first number of base units to form a first joint, joint 226. As depicted, the number of connectors, in the form of pin 228, is sent through knuckles of the first number of base units including base unit 230, base unit 232, base unit 234, base unit 236, base unit 238, base unit 240, base unit 204, and base unit 214.

Connecting plurality of interconnectable base units 202 comprises sending a number of connectors through knuckles of a second number of base units to form a second joint, joint 250. As depicted, the number of connectors, in the form of pin 251, is sent through knuckles of the second number of base units including base unit 232, base unit 236, base unit 240, base unit 214, base unit 268, base unit 270, base unit 272, and base unit 274. As can be seen, base unit 232, base unit 236, base unit 240, and base unit 214 are described as being in the first number of base units and the second number of base units. Although the terms first number and second number are used, these terms do not limit the relationship between these groups of base units or the order in which the base units are connected.

In other non-depicted illustrative examples, the first joint and the second joint are not separated by single row of base units. In some illustrative examples, the first joint and the second joint are separated by more than one row of base units. In some non-depicted illustrative examples, the first number of base units and the second number of base units do not overlap. In these non-depicted illustrative examples, the first number of base units and the second number of base units do not have any base units in common.

Folding dolly system 200 is configured to fold into plurality of rows 242 around an axis. Plurality of rows 242 is connected by plurality of joints 224. Each row of plurality of rows 242 rotates about a joint of plurality of joints 224. For example, row 244 is connected to row 246 by joint 226. Row 246 is connected to row 248 by joint 250. Row 248 is connected to row 252 by joint 254.

Folding dolly system 200 comprises plurality of wheels 256 connected to plurality of interconnectable base units 202. As depicted, plurality of wheels 256 is mounted on small bearings. The bearings provide a smooth rolling action for plurality of wheels 256.

As depicted, each base unit of plurality of interconnectable base units 202 is connected to at least one wheel of plurality of wheels 256. For example, base unit 204 is connected to wheel 258 of plurality of wheels 256. As another example, base unit 214 is connected to wheel 260 of plurality of wheels 256.

As depicted, each base unit of plurality of interconnectable base units 202 has a same design including a location of a connection to a wheel of plurality of wheels 256. As depicted, a respective wheel of plurality of wheels 256 is substantially centered on a respective base unit of plurality of interconnectable base units 202.

In this illustrative example, a rod extends through a plurality of wheels of a respective row of plurality of rows 242. For example, rod 262 extends through wheel 264, wheel 265, wheel 266, and wheel 258 of row 244.

Figure 3:
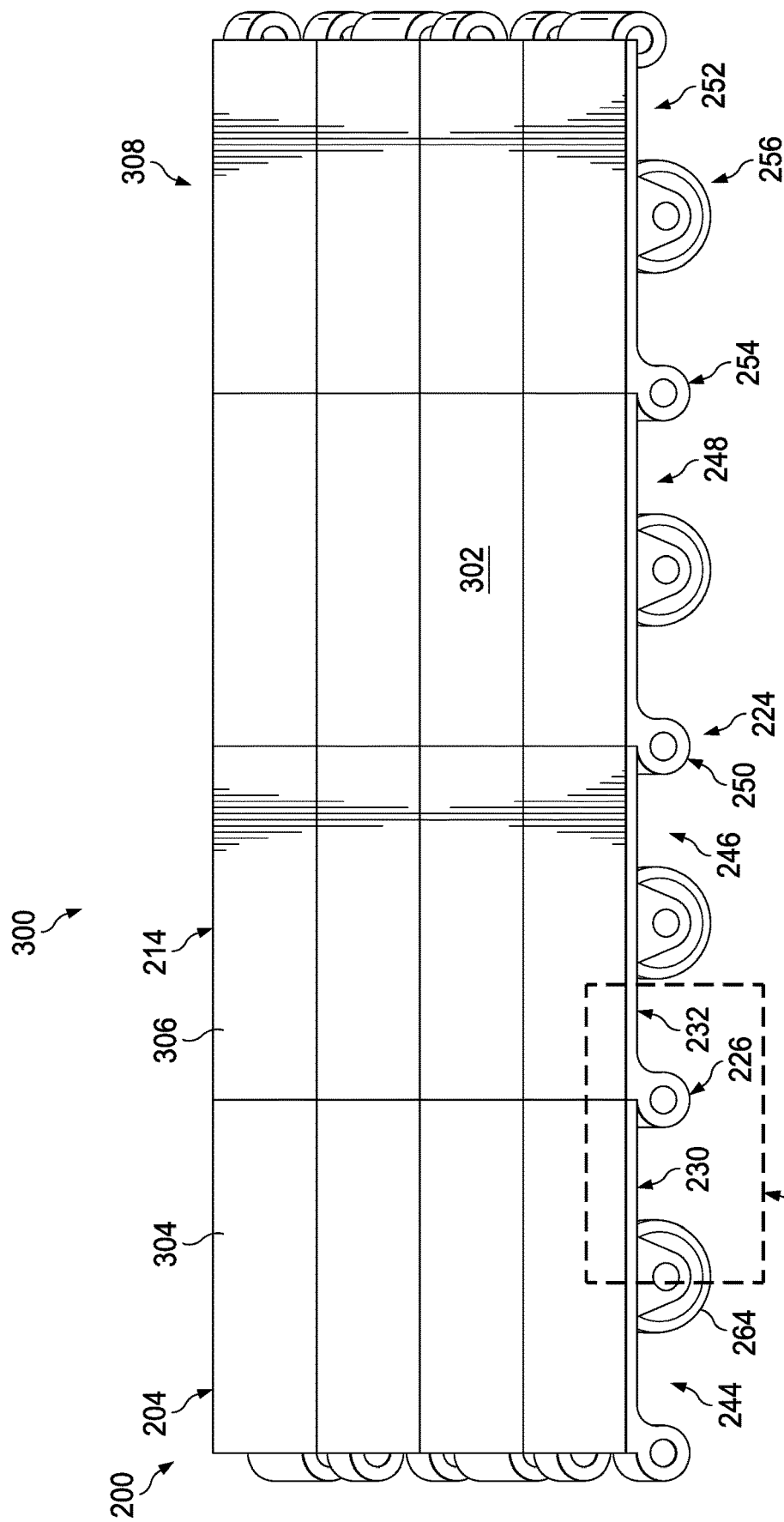
FIG. 3 is an illustration of a side view of a folding dolly system in accordance with an illustrative embodiment.

Turning now to FIG. 3, an illustration of a side view of a folding dolly system is depicted in accordance with an illustrative embodiment. View 300 is a side view of folding dolly system 200 of FIG. 2. Holding surface 302 of folding dolly system 200 is visible in view 300.

Each base unit of plurality of interconnectable base units 202 has a surface forming a portion of holding surface 302. For example, base unit 204 has surface 304 forming a portion of holding surface 302. Base unit 214 has surface 306 forming a portion of holding surface 302.

Plurality of interconnectable base units 202 is connected to form substantially planar holding surface 302. Each of plurality of joints 224 is configured to maintain planar holding surface 302 as substantially planar. For example, each of plurality of joints 224 is configured to react weight of a cargo on holding surface 302 to maintain a substantially planar layout of holding surface 302.

In view 300, folding dolly assembly has been unrolled and plurality of wheels 256 have been placed in contact with ground. Each of plurality of joints 224 is configured to prevent any further rotation of plurality of joints 224 when cargo is placed onto holding surface 302. Plurality of joints 224 is configured to prevent holding surface 302 from collapsing in a concave fashion when a load is applied. In some illustrative examples, a first edge and a second edge of each base unit is configured to react against a respective first edge or second edge of an adjacent base unit to form the holding surface to be substantially planar.

View 300 is a view of folding dolly system 200 in deployed position 308. In deployed position 308 holding surface 302 is substantially planar. In view 300, plurality of wheels 256 is in contact with ground 310 to maintain the substantially planar orientation of holding surface 302.

Figure 4:
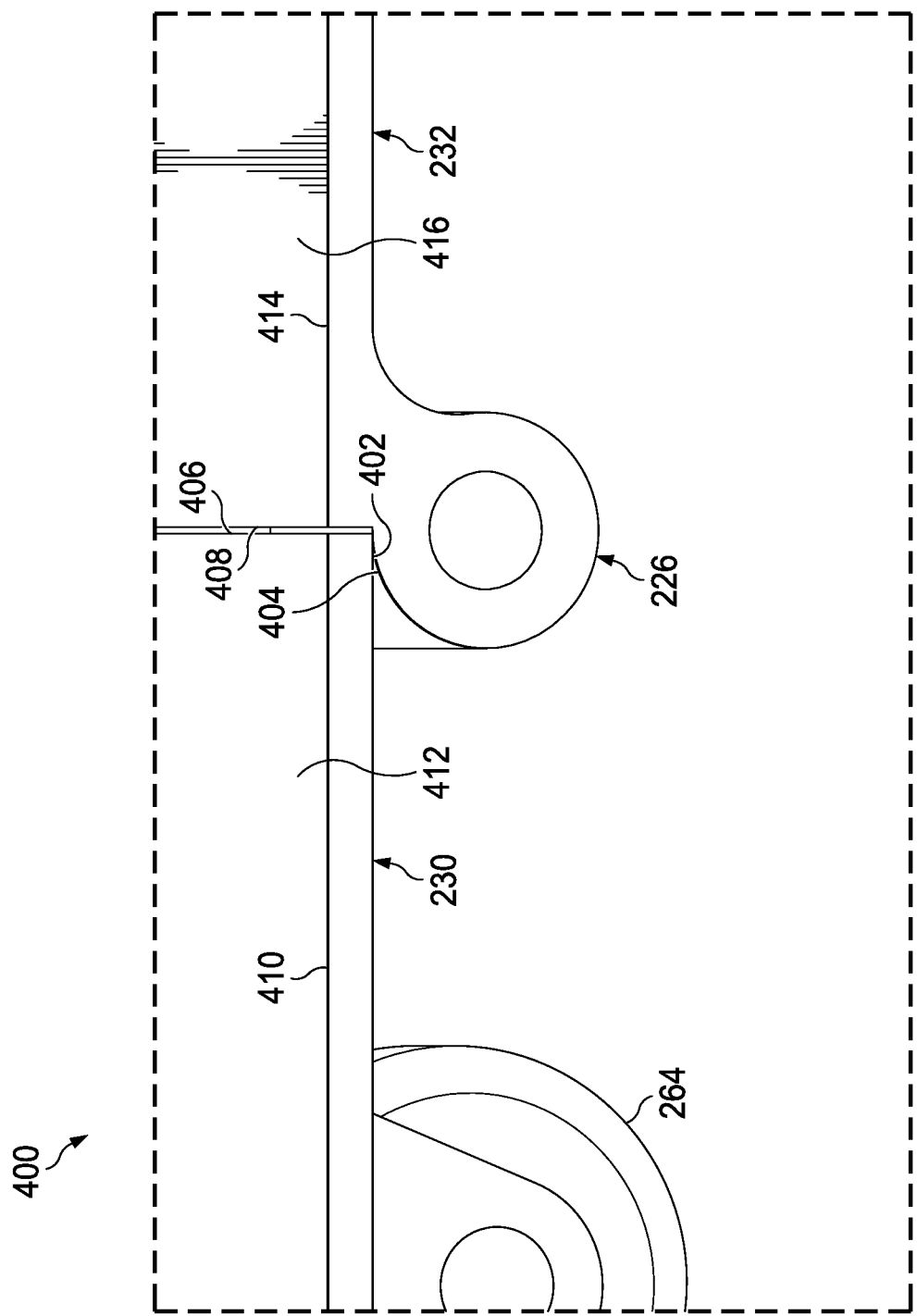
FIG. 4 is an illustration of a side view of a joint of a folding dolly system in accordance with an illustrative embodiment.

Turning now to FIG. 4, an illustration of a side view of a joint of a folding dolly system is depicted in accordance with an illustrative embodiment. View 400 is a view within the box within FIG. 3. View 400 is a view of joint 226 between base unit 230 and base unit 232. In view 400, bottom 402 of base unit 230 contacts knuckle 404 of base unit 232.

As depicted, second edge 406 of base unit 230 is configured to react against first edge 408 of adjacent base unit, base unit 232. By second edge 406 reacting against first edge 408, holding surface 302 is substantially planar. By second edge 406 reacting against first edge 408, holding surface 302 remains substantially planar when cargo is placed onto holding surface 302 of folding dolly system 200.

Second edge 406 of base unit 230 is configured to react against first edge 408 of adjacent base unit, base unit 232 to prevent any further rotation of joint 226. Joint 226 is configured this way to prevent holding surface 302 from collapsing in a concave fashion when a load is applied.

First edge 408 has a number of knuckles including knuckle 404. Second edge 406 also has a number of knuckles that are not visible in view 400. All of second edge 406 is configured to react against first edge 408.

Base unit 230 has third edge 410. As depicted, third edge 410 is substantially planar and substantially perpendicular to surface 412 of base unit 230. Base unit 232 has third edge 414. As depicted, third edge 414 is substantially planar and substantially perpendicular to surface 416 of base unit 232.

Figure 5:
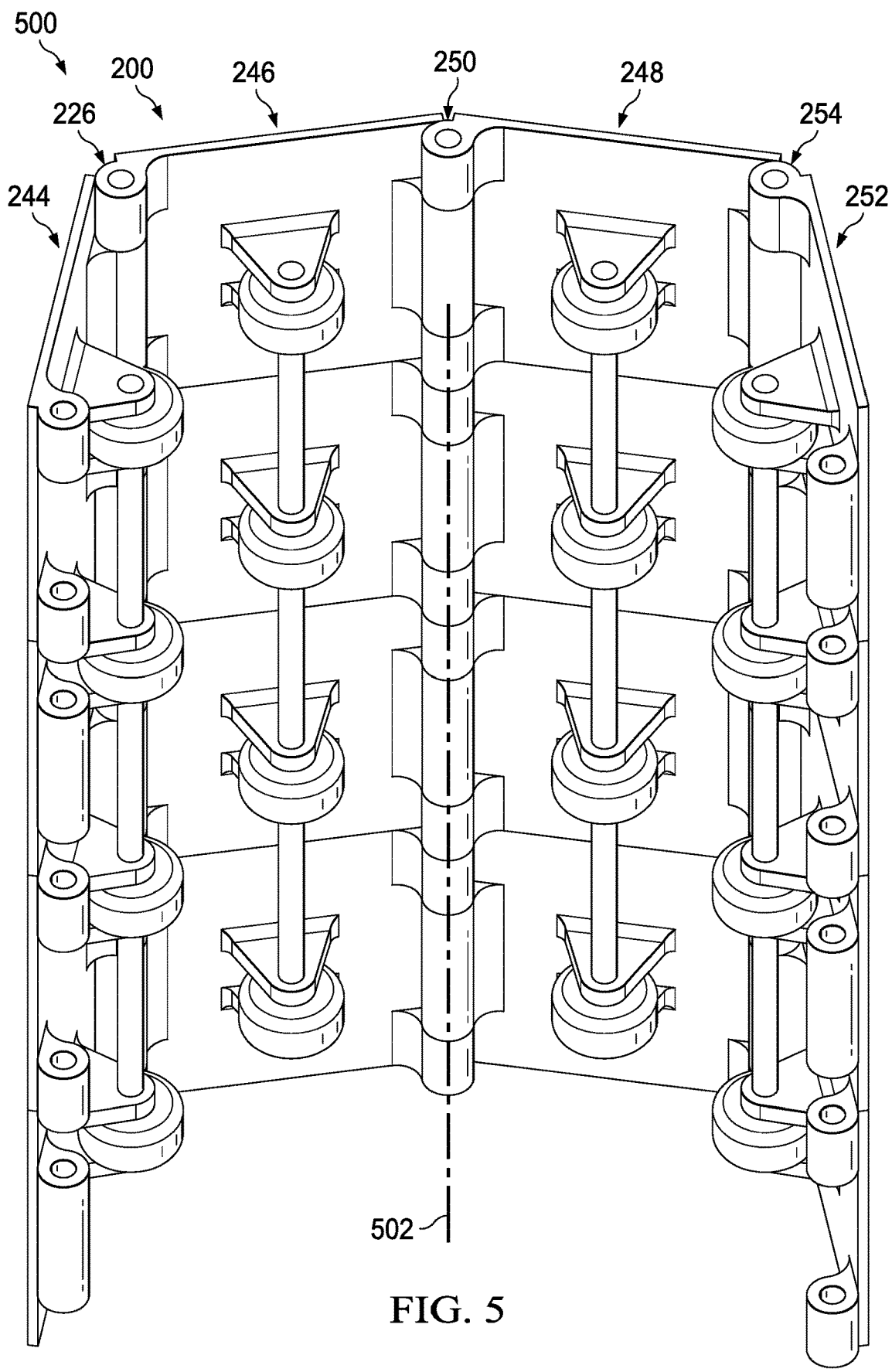
FIG. 5 is an illustration of a bottom perspective view of a folding dolly system during folding around an axis in accordance with an illustrative embodiment.

Turning now to FIG. 5, an illustration of a bottom perspective view of a folding dolly system during folding around an axis is depicted in accordance with an illustrative embodiment. In view 500, folding dolly system 200 is being rolled around axis 502. In view 500, holding surface 302 has been separated into plurality of rows 242. Each row of plurality of rows 242 is considered a separate plane. Each row of plurality of rows 242 is a portion of holding surface 302. Plurality of rows 242 is connected by plurality of joints 224. Row 244 is connected to row 246 by joint 226. Row 246 is connected to row 248 by joint 250. Row 248 is connected to row 252 by joint 254.

Row 244 rotates about joint 226 relative to row 246. Row 246 rotates about joint 226 relative to row 244. Row 252 rotates about joint 254 relative to row 248. Row 248 rotates about joint 254 relative to row 252. Row 248 rotates about joint 250 relative to row 246. Row 246 rotates about joint 250 relative to row 248.

In some illustrative examples, folding dolly system 200 is rolled around axis 502 by moving at least two of plurality of rows 242 relative to each other substantially simultaneously. As folding dolly system 200 is rolled around axis 502, row 244 and row 252 are brought closer to each other.

Figure 6:
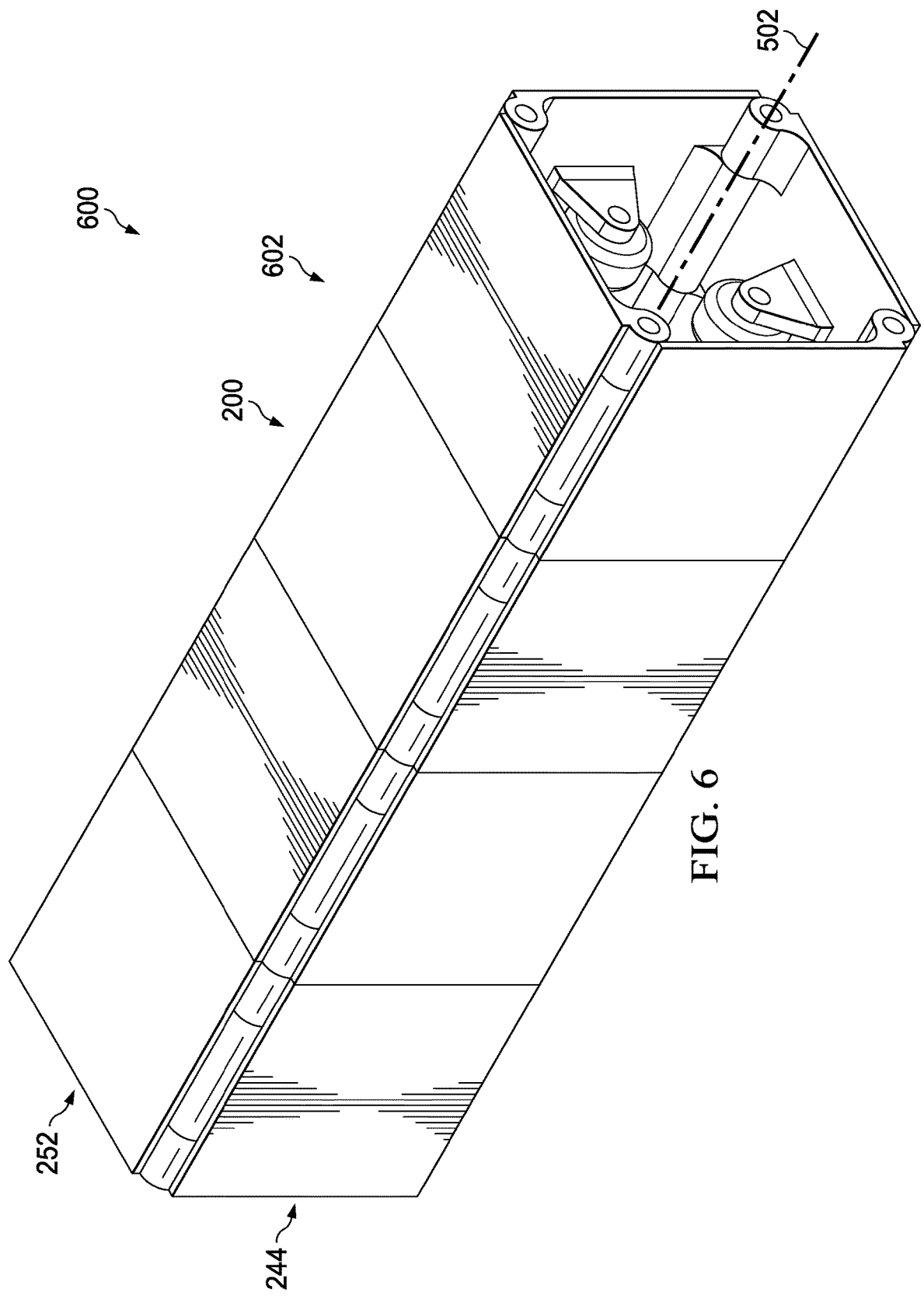
FIG. 6 is an illustration of a top perspective view of a folding dolly system folded around an axis in accordance with an illustrative embodiment.

Turning now to FIG. 6, an illustration of a top perspective view of a folding dolly system folded around an axis is depicted in accordance with an illustrative embodiment. View 600 is a view of folding dolly system 200 in stored position 602.

In stored position 602, row 244 is in contact with row 252. In view 600 knuckles of row 244 are positioned between knuckles of row 252.

Figure 7:
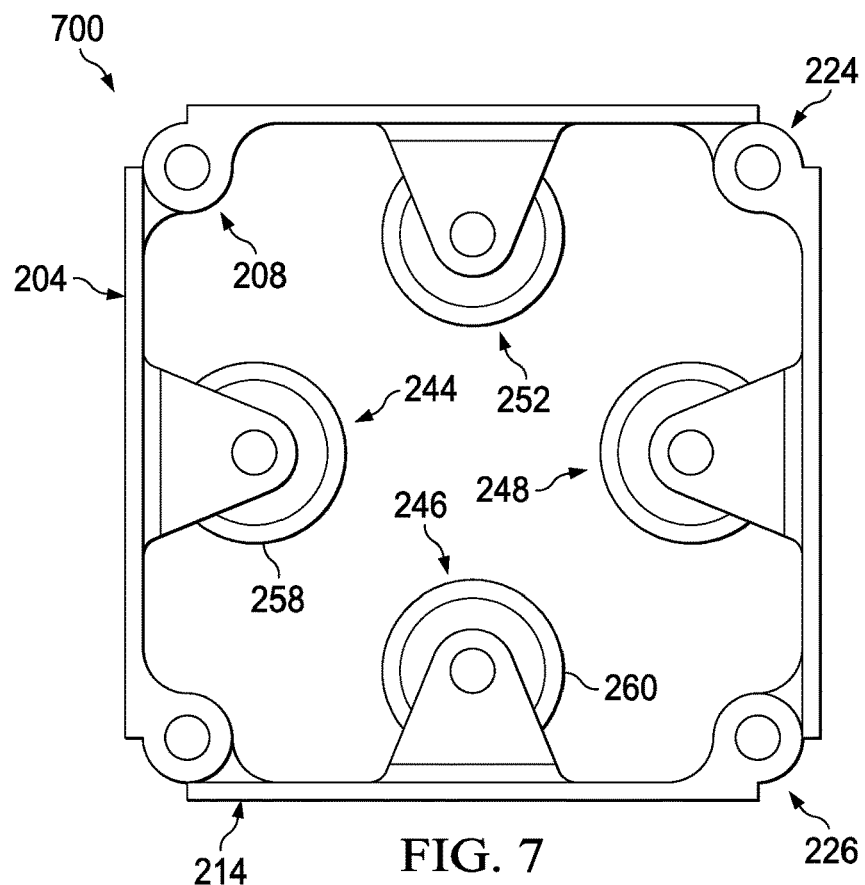
FIG. 7 is an illustration of a side view of a folding dolly system folded around an axis in accordance with an illustrative embodiment.

Turning now to FIG. 7, an illustration of a side view of a folding dolly system folded around an axis is depicted in accordance with an illustrative embodiment. View 700 is a view of folding dolly system 200 in stored position 602 along axis 502. In view 700, plurality of wheels 256 is visible. In view 700 plurality of wheels 256 is contacting each other. The size of folding dolly system 200 is influenced by positioning of plurality of wheels 256 on plurality of interconnectable base units 202.

The illustration of folding dolly system 200 in FIGS. 2-7 is not meant to imply physical or architectural limitations to the manner in which an illustrative embodiment may be implemented. Other components in addition to or in place of the ones illustrated may be used. Some components may be unnecessary. For example, each base unit of plurality of interconnectable base units 202 is connected to a respective wheel of plurality of wheels 256. However, in other non-depicted examples, at least one base unit of plurality of interconnectable base units 202 is not connected to a respective wheel. In some non-depicted examples, at least one base unit of plurality of interconnectable base units 202 has a different design. Base units can be added to plurality of interconnectable base units 202 or removed from interconnectable base units 202 to change a size of holding surface 302 of folding dolly system 200.

Figure 8:
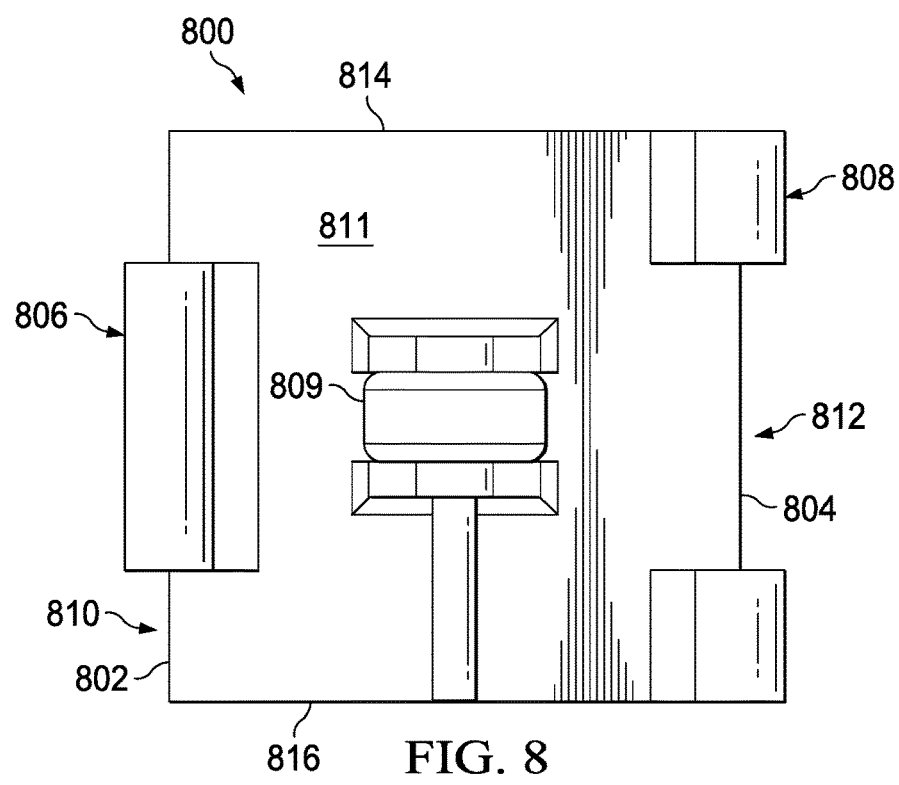
FIG. 8 is an illustration of a bottom view of a base unit of a folding dolly system in accordance with an illustrative embodiment.

Turning now to FIG. 8, an illustration of a bottom view of a base unit of a folding dolly system is depicted in accordance with an illustrative embodiment. Base unit 800 is a physical implementation of one base unit of plurality of interconnectable base units 108 of FIG. 1. In some illustrative examples, base unit 800 is one of plurality of interconnectable base units 202 of FIG. 2. Base unit 800 can be joined to other base units to form folding dolly system 102 of FIG. 1. Base unit 800 can be joined to other base units to form folding dolly system 200 of FIG. 2. In some illustrative examples, base unit 800 is added to folding dolly system 200 to increase the surface area of holding surface 302 of FIG. 3.

Base unit 800 has first edge 802, second edge 804, and a surface (not depicted) between first edge 802 and second edge 804. The surface is substantially planar.

First edge 802 has number of knuckles 806 for forming a joint. Second edge 804 has number of knuckles 808 for forming a joint. Base unit 800 also has wheel 809. Wheel 809 is connected to bottom 811 of base unit 800.

Remainder 810 of first edge 802 is configured to react against a second base unit forming the joint with number of knuckles 806 to provide a substantially planar holding surface of a folding dolly system. Number of knuckles 806 of first edge 802 is configured to support a remainder of a second edge of a second base unit to provide a substantially planar holding surface of the folding dolly system.

Remainder 812 of second edge 804 is configured to react against a second base unit forming the joint with number of knuckles 808 to provide a substantially planar holding surface of a folding dolly system. Number of knuckles 808 of second edge 804 is configured to support a remainder of a first edge of a second base unit to provide a substantially planar holding surface of the folding dolly system. Third edge 814 and fourth edge 816 of base unit 800 are each substantially planar and substantially perpendicular to the surface (not depicted).

Figure 9:
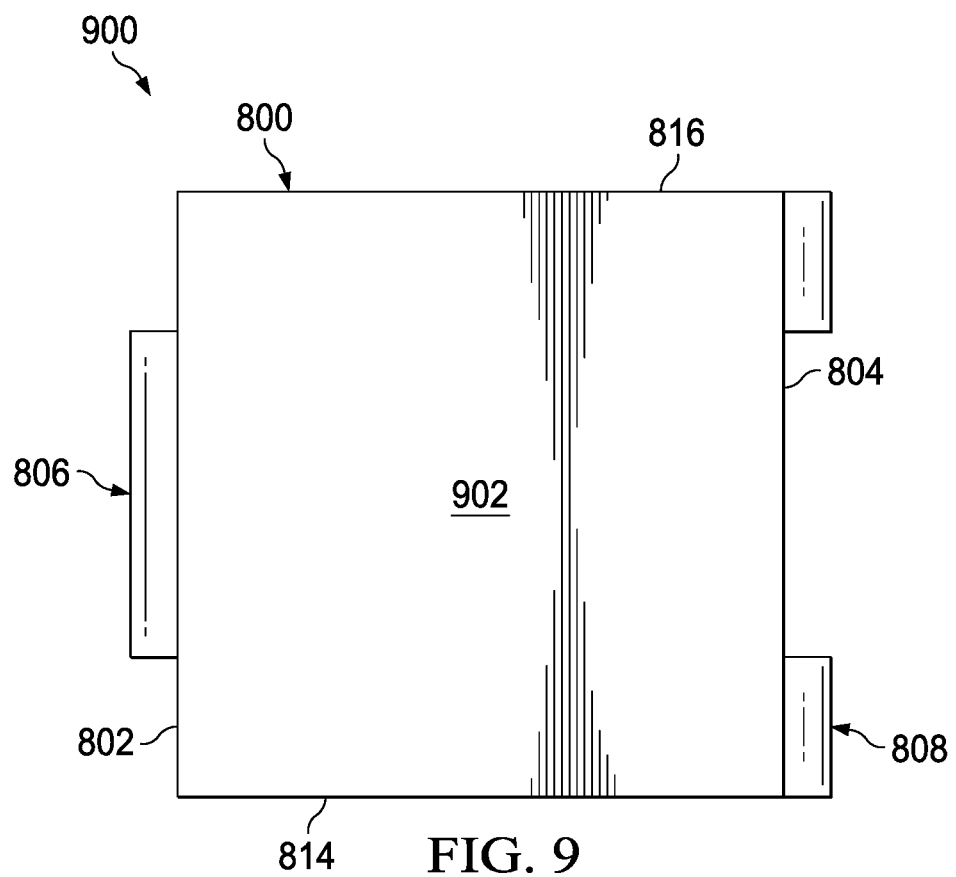
FIG. 9 is an illustration of a top view of a base unit of a folding dolly system in accordance with an illustrative embodiment.

Turning now to FIG. 9, an illustration of a top view of a base unit of a folding dolly system is depicted in accordance with an illustrative embodiment. View 900 is a top view of base unit 800 of FIG. 8. Surface 902 is visible in view 900. Surface 902 is positioned between first edge 802 and second edge 804. Surface 902 is substantially planar.

When base unit 800 is joined to other base units to form a foldable dolly system, surface 902 forms a portion of a holding surface. Base unit 800 is connected to any desirable quantity of interconnectable base units to form the foldable dolly system.

Figure 10:
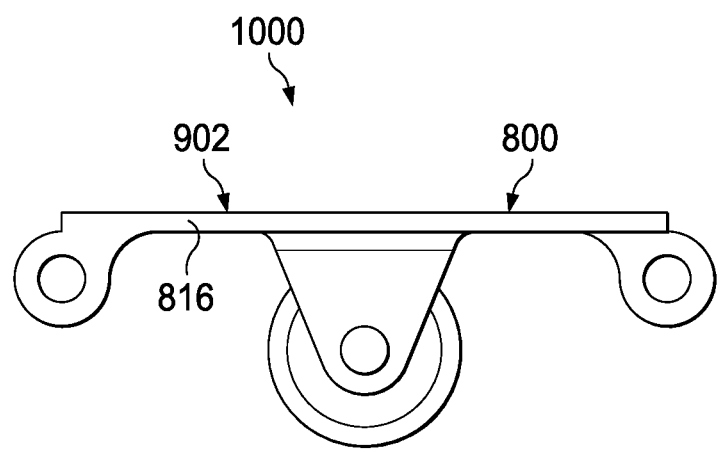
FIG. 10 is an illustration of a side view of a base unit of a folding dolly system in accordance with an illustrative embodiment.

Turning now to FIG. 10, an illustration of a side view of a base unit of a folding dolly system is depicted in accordance with an illustrative embodiment. Side view 1000 is a side view of base unit 800. Side view 1000 is a view of fourth edge 816. Fourth edge 816 is substantially planar and substantially perpendicular to surface 902.

Figure 11:
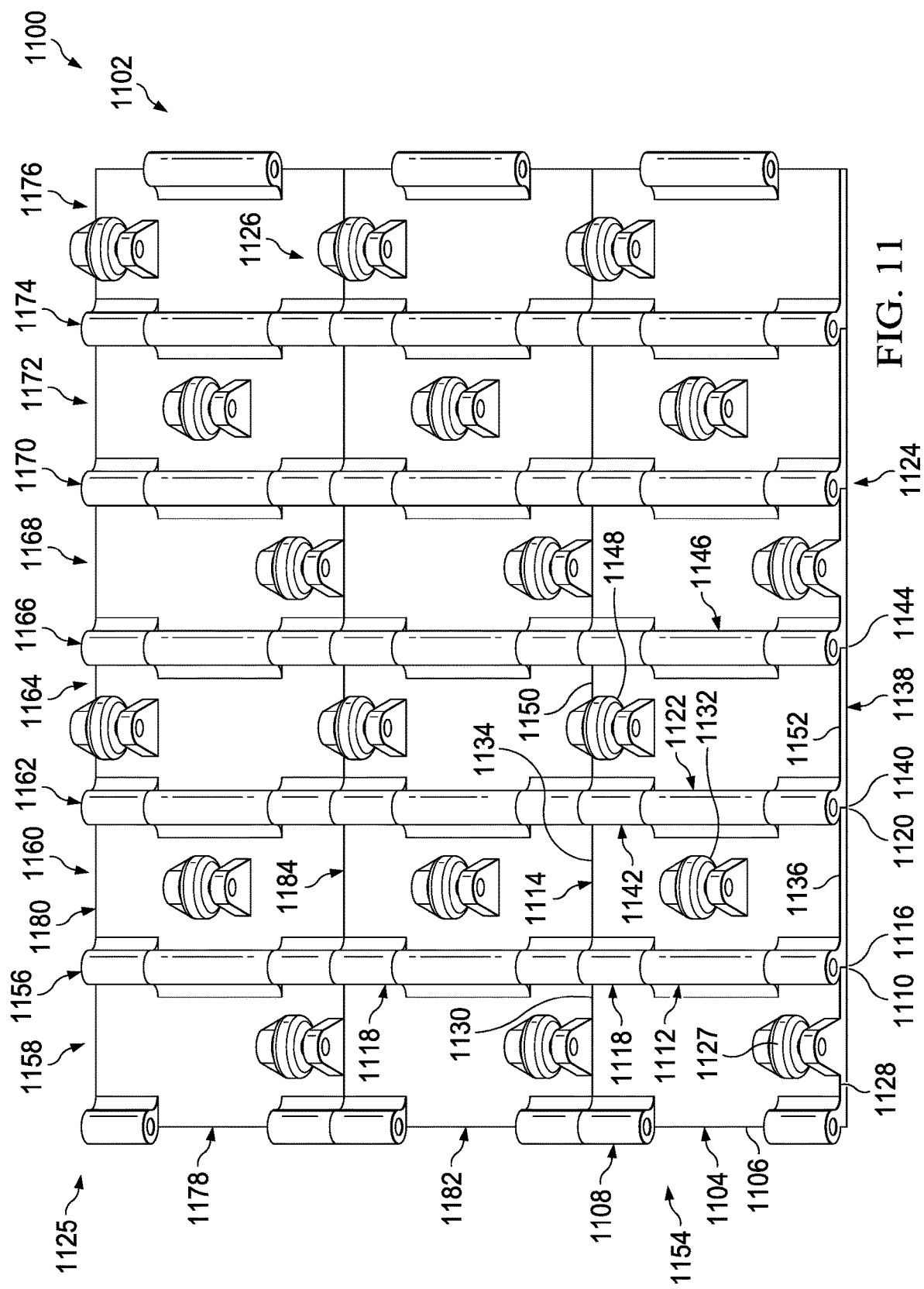
FIG. 11 is an illustration of a bottom view of a folding dolly system in accordance with an illustrative embodiment.

Turning now to FIG. 11, an illustration of a bottom view of a folding dolly system is depicted in accordance with an illustrative embodiment. Folding dolly system 1100 is a physical implementation of folding dolly system 102 of FIG. 1. Folding dolly system 1100 comprises plurality of interconnectable base units 1102 connected to form a substantially planar holding surface. Each base unit of plurality of interconnectable base units 1102 comprises a first edge with a number of knuckles configured to form a joint, a second edge with a number of knuckles configured to form a joint, and a surface forming a portion of the holding surface.

For example, base unit 1104 comprises first edge 1106 with number of knuckles 1108, second edge 1110 with number of knuckles 1112, and a surface (not depicted). As another example, base unit 1114 comprises first edge 1116 with number of knuckles 1118, second edge 1120 with number of knuckles 1122, and a surface (not depicted).

Plurality of interconnectable base units 1102 is connected by plurality of joints 1124. Each joint of plurality of joints 1124 is formed by a number of connectors. The number of connections comprises at least one of a number of shoulder bolts or a pin.

Folding dolly system 1100 is configured to fold into plurality of rows 1125 around an axis. Plurality of rows 1125 is connected by plurality of joints 1124. Each row of plurality of rows 1125 rotates about a joint of plurality of joints 1124.

Folding dolly system 1100 is one non-limiting example of folding dolly system 102 of FIG. 1. Folding dolly system 1100 has a different design than folding dolly system 200 of FIG. 2. Folding dolly system 1100 has a different quantity of rows in plurality of rows 1125 than the quantity of rows of plurality of rows 242 of FIG. 2.

Additionally, each base unit of plurality of interconnectable base units 1102 has a different design than the base units of plurality of interconnectable base units 202 of FIG. 2.

Folding dolly system 1100 comprises plurality of wheels 1126 connected to plurality of interconnectable base units 1102. As depicted, plurality of wheels 1126 is mounted on small bearings. The bearings provide a smooth rolling action for plurality of wheels 1126.

As depicted, each base unit of plurality of interconnectable base units 1102 is connected to at least one wheel of plurality of wheels 1126. For example, base unit 1104 is connected to wheel 1127 of plurality of wheels 1126. As depicted, wheel 1127 is not centered on base unit 1104. Wheel 1127 is positioned closer to third edge 1128 of base unit 1104 than fourth edge 1130 of base unit 1104.

Base unit 1114 is connected to wheel 1132 of plurality of wheels 1126. As depicted, wheel 1132 is centered on base unit 1114. Wheel 1132 is positioned substantially equidistance from third edge 1136 and fourth edge 1134 of base unit 1104.

Base unit 1138 comprises first edge 1140 with number of knuckles 1142, second edge 1144 with number of knuckles 1146, and a surface (not depicted). Base unit 1138 is connected to wheel 1148 of plurality of wheels 1126. As depicted, wheel 1148 is not centered on base unit 1138. Wheel 1148 is positioned closer to fourth edge 1150 of base unit 1138 than third edge 1152 of base unit 1138.

In folding dolly system 1100 plurality of interconnectable base units 1102 are organized in plurality of rows 1125 and plurality of columns 1154. In folding dolly system 1100, each row of plurality of rows 1125 comprises a plurality of base units with wheels in substantially the same position. In folding dolly system 1100, each column of plurality of columns 1154 has a plurality of different wheel positions.

Plurality of joints 1124 connects plurality of rows 1125. For example, joint 1156 connects row 1158 and row 1160 of plurality of rows 1125. Row 1158 includes base unit 1104. Row 1160 includes base unit 1114. Joint 1156 connects base unit 1104 and base unit 1114.

Row 1160 is connected by joint 1162 to row 1164. Row 1164 is connected by joint 1166 to row 1168. Row 1168 is connected by joint 1170 to row 1172. Row 1172 is connected by joint 1174 to row 1176.

Folding dolly system 1100 is configured to fold into plurality of rows 1125 around an axis. Plurality of rows 1125 is connected by plurality of joints 1124. Each row of plurality of rows 1125 rotates about a joint of plurality of joints 1124.

Row 1158 rotates about joint 1156 relative to row 1160. Row 1160 rotates about joint 1156 relative to row 1158. Row 1160 rotates about joint 1162 relative to row 1164.

For example, joint 1156 is formed by at least one of a pin or a shoulder bolt. Joint 1156 includes knuckles of each of base unit 1178, base unit 1180, base unit 1182, base unit 1184, base unit 1104, and base unit 1114. In some illustrative examples, a pin connects knuckles of each of base unit 1178, base unit 1180, base unit 1182, base unit 1184, base unit 1104, and base unit 1114. In some illustrative examples, a shoulder bolt connects knuckles of base unit 1178 and base unit 1180, another shoulder bolt connects knuckles of base unit 1182 and base unit 1184, and yet another shoulder bolt connects knuckles of base unit 1104 and base unit 1114. In some illustrative examples, a combination of a number of pins and a number of shoulder bolts forms joint 1156.

Figure 12:
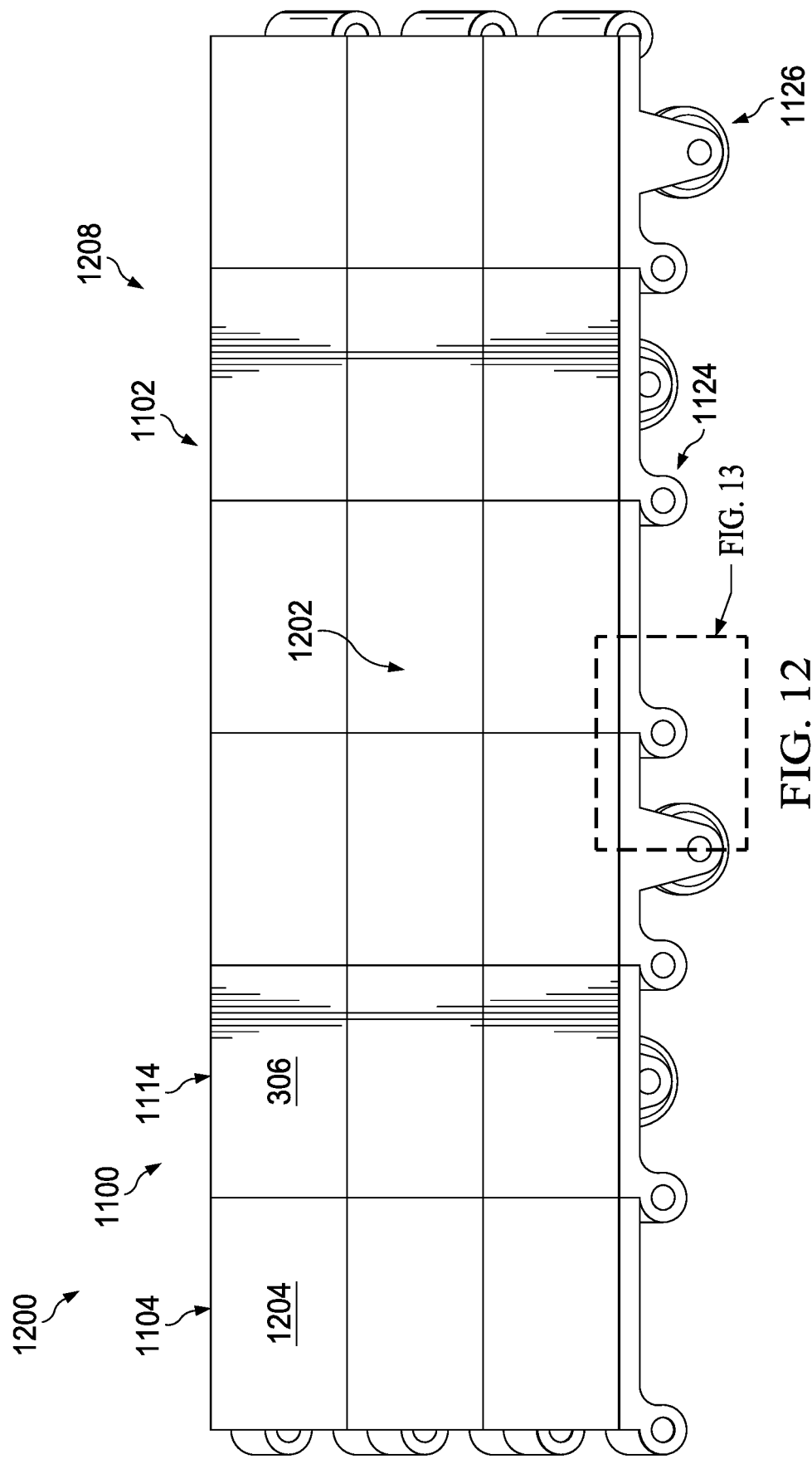
FIG. 12 is an illustration of a side view of a folding dolly system in accordance with an illustrative embodiment.

Turning now to FIG. 12, an illustration of a side view of a folding dolly system is depicted in accordance with an illustrative embodiment. View 1200 is a side view of folding dolly system 1100 of FIG. 11. Holding surface 1202 of folding dolly system 1100 is visible in view 1200.

Each base unit of plurality of interconnectable base units 1102 has a surface forming a portion of holding surface 1202. For example, base unit 1104 has surface 1204 forming a portion of holding surface 1202. Base unit 1114 has surface 306 forming a portion of holding surface 1202.

Plurality of interconnectable base units 1102 is connected to form substantially planar holding surface 1202. Each of plurality of joints 1124 is configured to maintain planar holding surface 1202 as substantially planar. For example, each of plurality of joints 1124 is configured to react weight of a cargo on holding surface 1202 to maintain a substantially planar layout of holding surface 1202.

In view 1200, folding dolly assembly has been unrolled and plurality of wheels 1126 have been placed in contact with ground. Each of plurality of joints 1124 is configured to prevent any further rotation of plurality of joints 1124 when cargo is placed onto holding surface 1202. Plurality of joints are configured to prevent holding surface 1202 from collapsing in a concave fashion when a load is applied. In some illustrative examples, a first edge and a second edge of each base unit is configured to react against a respective first edge or second edge of an adjacent base unit to form the holding surface to be substantially planar.

View 1200 is a view of folding dolly system 1100 in deployed position 1208. In deployed position 1208 holding surface 1202 is substantially planar. In view 1200, plurality of wheels 1126 is in contact with ground 1210 to maintain the substantially planar orientation of holding surface 1202.

Figure 13:
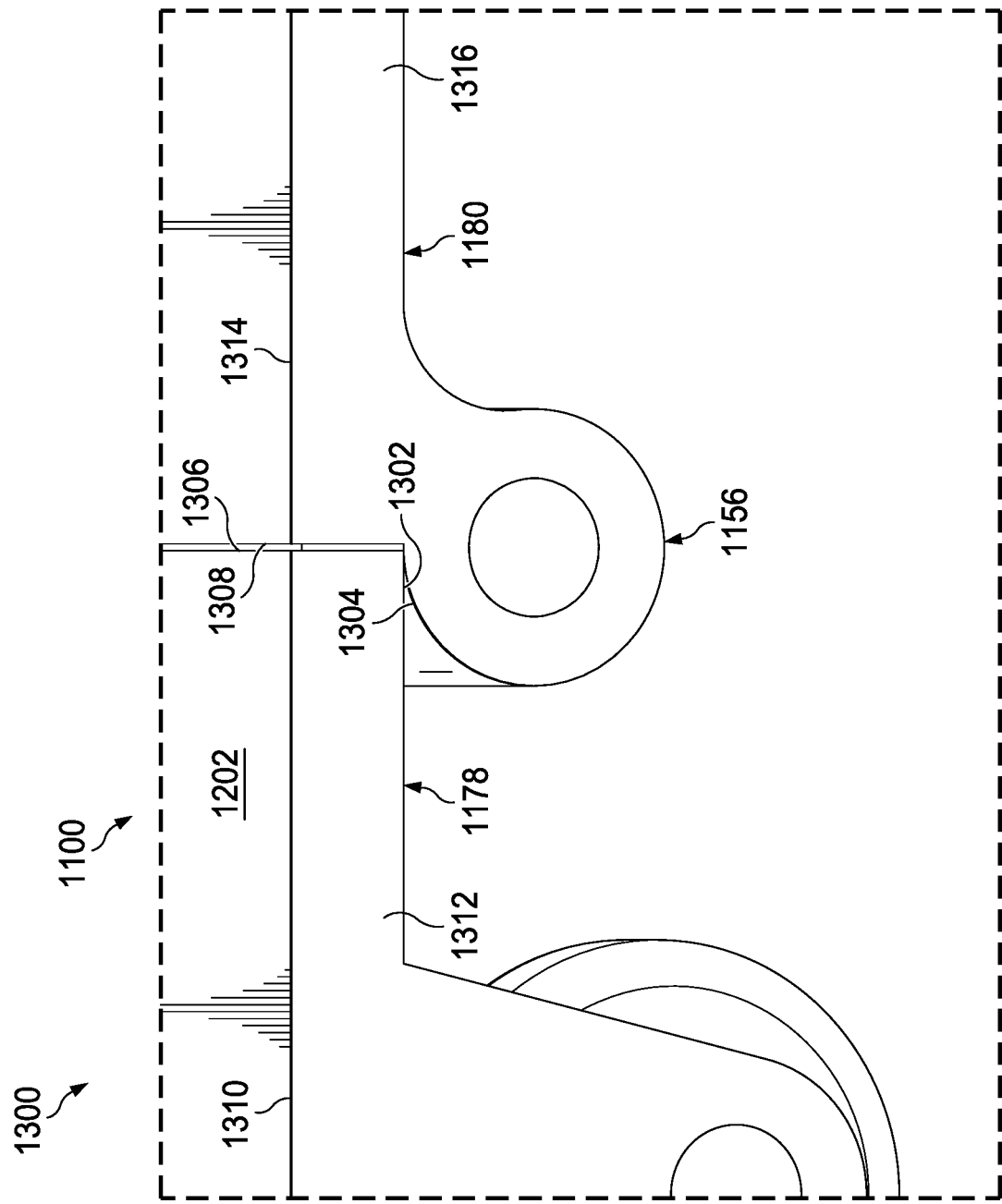
FIG. 13 is an illustration of a side view of a joint of a folding dolly system in accordance with an illustrative embodiment.

Turning now to FIG. 13, an illustration of a side view of a joint of a folding dolly system is depicted in accordance with an illustrative embodiment. View 1300 is a view within the box within FIG. 12. View 1300 is a view of joint 1156 between base unit 1178 and base unit 1180. In view 1300, bottom 1302 of base unit 1178 contacts knuckle 1304 of base unit 1180.

As depicted, second edge 1306 of base unit 1178 is configured to react against first edge 1308 of adjacent base unit, base unit 1178. By second edge 1306 reacting against first edge 1308, holding surface 1202 is substantially planar. By second edge 1306 reacting against first edge 1308, holding surface 1202 remains substantially planar when cargo is placed onto holding surface 1202 of folding dolly system 1100.

Second edge 1306 of base unit 1178 is configured to react against first edge 1308 of adjacent base unit, base unit 1178 to prevent any further rotation of joint 1156. Joint 1156 is configured this way to prevent holding surface 1202 from collapsing in a concave fashion when a load is applied.

First edge 1308 has a number of knuckles including knuckle 1304. Second edge 1306 also has a number of knuckles that are not visible in view 1300. All of second edge 1306 is configured to react against first edge 1308.

Base unit 1178 has third edge 1310. As depicted, third edge 1310 is substantially planar and substantially perpendicular to surface 1312 of base unit 1178. Base unit 1180 has third edge 1314. As depicted, third edge 1314 is substantially planar and substantially perpendicular to surface 1316 of base unit 1180.

Figure 14:
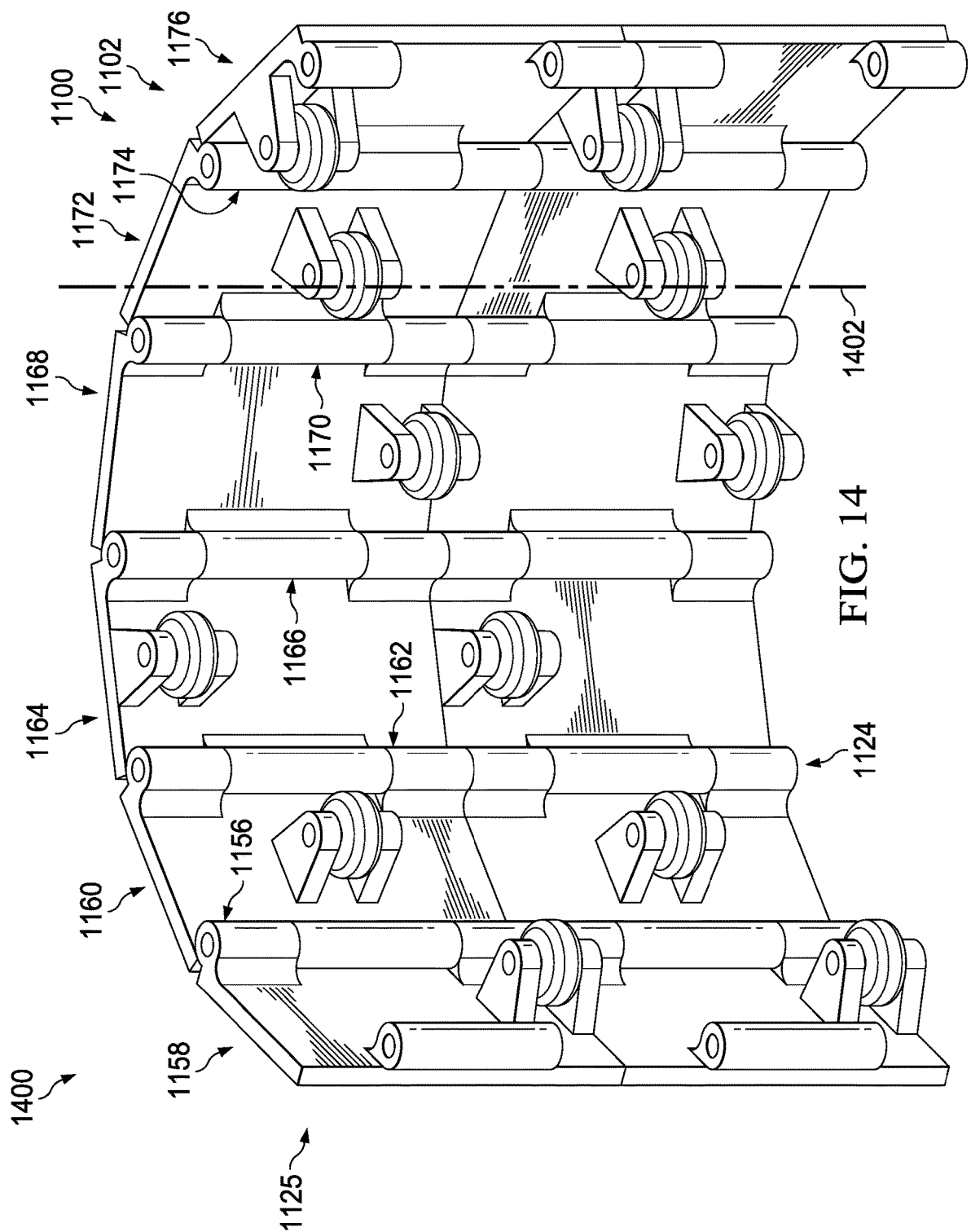
FIG. 14 is an illustration of a bottom perspective view of a folding dolly system during folding around an axis in accordance with an illustrative embodiment.

Turning now to FIG. 14, an illustration of a bottom perspective view of a folding dolly system during folding around an axis is depicted in accordance with an illustrative embodiment. In view 1400, folding dolly system 1100 is being rolled around axis 1402. In view 1400, holding surface 1202 has been separated into plurality of rows 1125. Each row of plurality of rows 1125 is considered a separate plane. Each row of plurality of rows 1125 is a portion of holding surface 1202. Plurality of rows 1125 is connected by plurality of joints 1124. Row 1158 is connected to row 1160 by joint 1156. Row 1160 is connected to row 1164 by joint 1162. Row 1164 is connected to row 1168 by joint 1166. Row 1168 is connected to row 1172 by joint 1170. Row 1172 is connected to row 1176 by joint 1174.

Row 1158 rotates about joint 1156 relative to row 1160. Row 1160 rotates about joint 1156 relative to row 1158. Row 1160 rotates about joint 1162 relative to row 1164. Row 1164 rotates about joint 1162 relative to row 1160. Row 1164 rotates about joint 1166 relative to row 1168. Row 1168 rotates about joint 1170 relative to row 1172. Row 1172 rotates about joint 1170 relative to row 1168. Row 1172 rotates about joint 1174 relative to row 1176. Row 1176 rotates about joint 1174 relative to row 1172.

In some illustrative examples, folding dolly system 1100 is rolled around axis 1402 by moving at least two of plurality of rows 1125 relative to each other substantially simultaneously. In some illustrative examples, as folding dolly system 1100 is rolled around axis 1402, plurality of rows 1125 is spiraled around itself.

Figure 15:
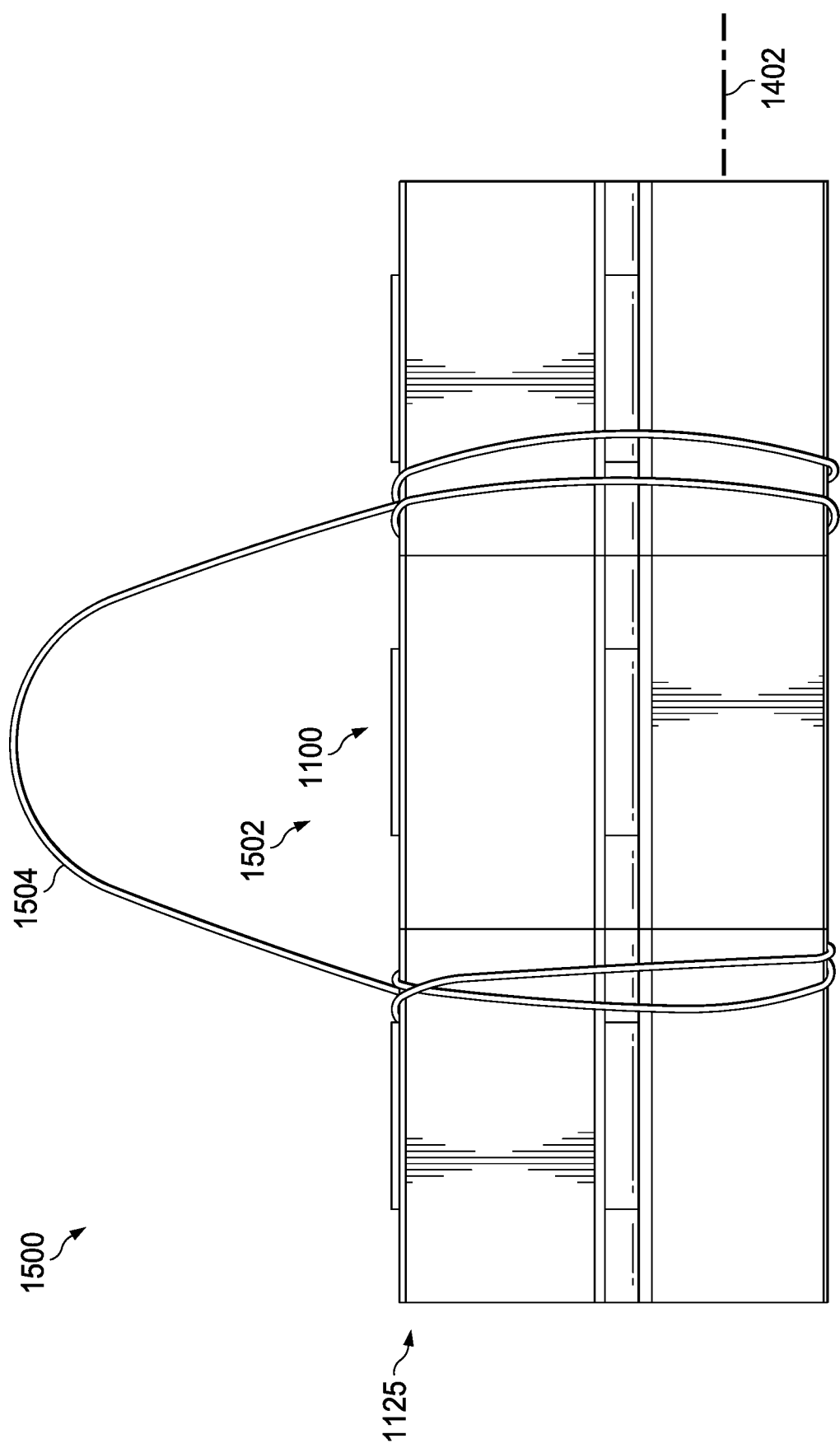
FIG. 15 is an illustration of a top perspective view of a folding dolly system folded around an axis in accordance with an illustrative embodiment.

Turning now to FIG. 15, an illustration of a top perspective view of a folding dolly system folded around an axis is depicted in accordance with an illustrative embodiment. View 1500 is a view of folding dolly system 1100 in stored position 1502.

In stored position 1502, plurality of rows 1125 is spiraled around itself. In stored position 1502, plurality of rows 1125 spirals around axis 1402. In stored position 1502, plurality of rows 1125 wraps around axis 1402 in an overlapping fashion.

As depicted, folding dolly system 1100 includes securing strap 1504. Securing strap 1504 holds folding dolly system 1100 in stored position 1502. In some illustrative examples, securing strap 1504 also acts as a handle for propelling folding dolly system 1100.

Figure 16:
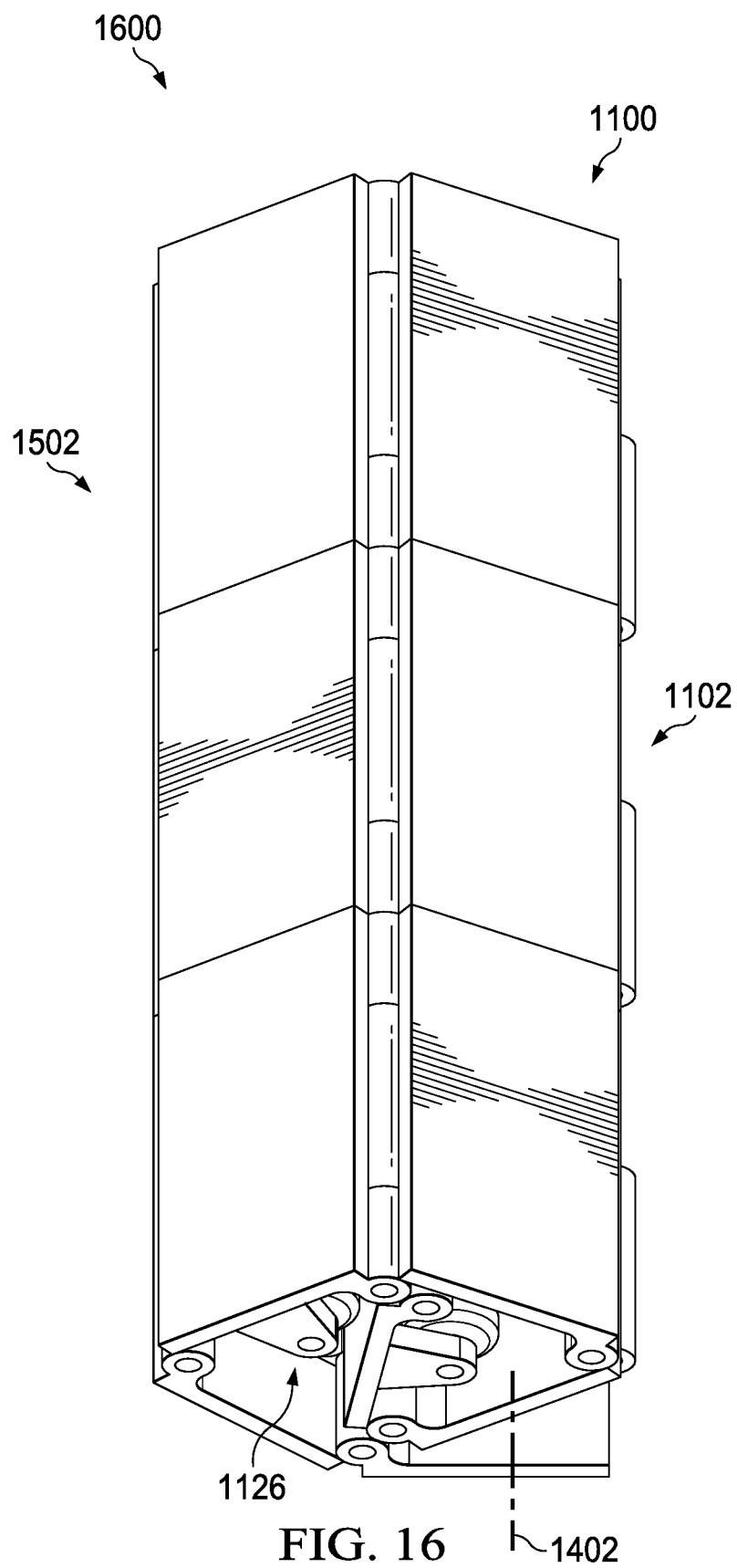
FIG. 16 is an illustration of a side view of a folding dolly system folded around an axis in accordance with an illustrative embodiment.

Turning now to FIG. 16, an illustration of a side view of a folding dolly system folded around an axis is depicted in accordance with an illustrative embodiment. View 1600 is a view of folding dolly system 1100 in stored position 1502 along axis 1402. In view 1600, plurality of wheels 1126 is visible. In view 1600 plurality of wheels 1126 does not contact each other due to plurality of wheels 1126 being offset from each other. The size of folding dolly system 1100 in stored position 1502 is influenced by positioning of plurality of wheels 1126 on plurality of interconnectable base units 1102.

In view 1600 plurality of rows 1125 has been rolled around axis 1402. Plurality of rows 1125 comprises a plurality of surfaces wrapping about axis 1402 by means of folding/rolling action. Plurality of rows 1125 may be referred to as "planes" or "planar surfaces" spiraling about axis 1402.

The illustration of folding dolly system 1100 in FIGS. 11-16 is not meant to imply physical or architectural limitations to the manner in which an illustrative embodiment may be implemented. Other components in addition to or in place of the ones illustrated may be used. Some components may be unnecessary. For example, each base unit of plurality of interconnectable base units 1102 is connected to a respective wheel of plurality of wheels 1126. However, in other non-depicted examples, at least one base unit of plurality of interconnectable base units 1102 is not connected to a respective wheel. In some non-depicted examples, at least one base unit of plurality of interconnectable base units 1102 has a different design. Base units can be added to plurality of interconnectable base units 1102 or removed from interconnectable base units 1102 to change a size of holding surface 1202 of folding dolly system 1100.

Figure 17:
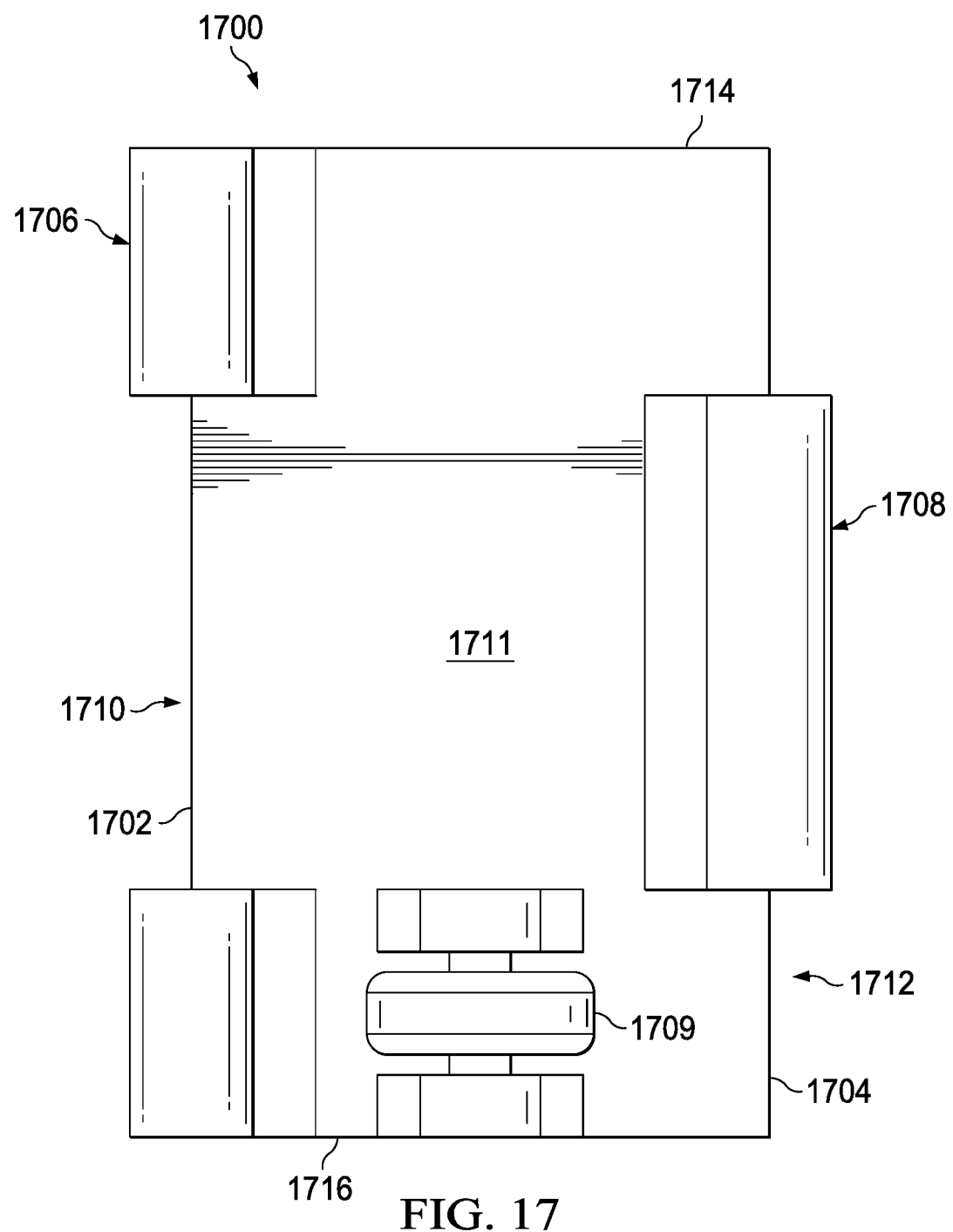
FIG. 17 is an illustration of a bottom view of a base unit of a folding dolly system in accordance with an illustrative embodiment.

Turning now to FIG. 17, an illustration of a bottom view of a base unit of a folding dolly system is depicted in accordance with an illustrative embodiment. Base unit 1700 is a physical implementation of one base unit of plurality of interconnectable base units 108 of FIG. 1. In some illustrative examples, base unit 1700 is one of plurality of interconnectable base units 1102 of FIG. 11. Base unit 1700 can be joined to other base units to form folding dolly system 102 of FIG. 1. Base unit 1700 can be joined to other base units to form folding dolly system 1100 of FIG. 11. In some illustrative examples, base unit 1700 is added to folding dolly system 1100 to increase the surface area of holding surface 1202 of FIG. 12.

Base unit 1700 has first edge 1702, second edge 1704, and a surface (not depicted) between first edge 1702 and second edge 1704. The surface is substantially planar.

First edge 1702 has number of knuckles 1706 for forming a joint. Second edge 1704 has number of knuckles 1708 for forming a joint. Base unit 1700 also has wheel 1709. Wheel 1709 is connected to bottom 1711 of base unit 1700.

Remainder 1710 of first edge 1702 is configured to react against a second base unit forming the joint with number of knuckles 1706 to provide a substantially planar holding surface of a folding dolly system. Number of knuckles 1706 of first edge 1702 is configured to support a remainder of a second edge of a second base unit to provide a substantially planar holding surface of the folding dolly system.

Remainder 1712 of second edge 1704 is configured to react against a second base unit forming the joint with number of knuckles 1708 to provide a substantially planar holding surface of a folding dolly system. Number of knuckles 1708 of second edge 1704 is configured to support a remainder of a first edge of a second base unit to provide a substantially planar holding surface of the folding dolly system.

Third edge 1714 and fourth edge 1716 of base unit 1700 are each substantially planar and substantially perpendicular to the surface (not depicted).

Figure 18:
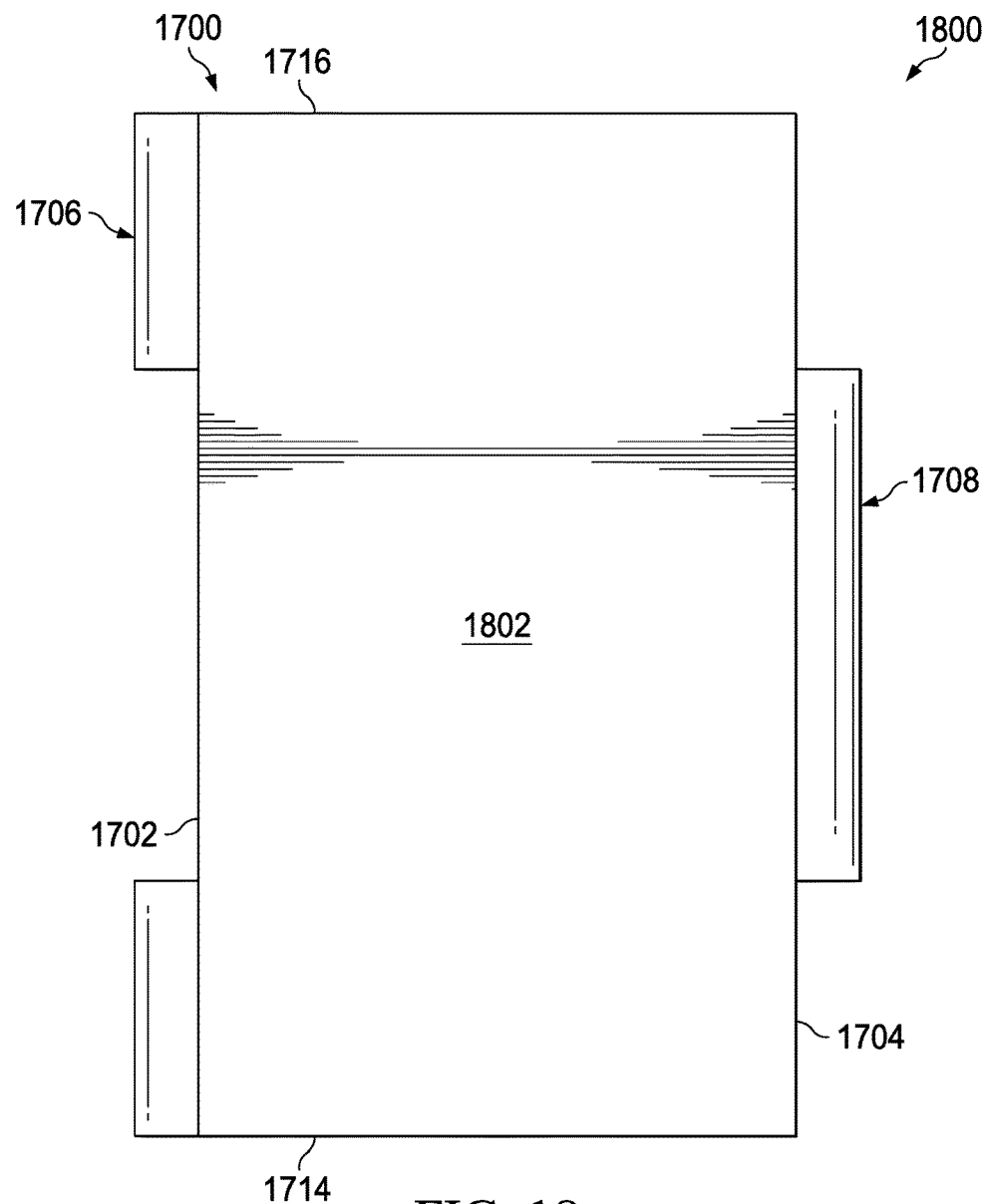
FIG. 18 is an illustration of a top view of a base unit of a folding dolly system in accordance with an illustrative embodiment.

Turning now to FIG. 18, an illustration of a top view of a base unit of a folding dolly system is depicted in accordance with an illustrative embodiment. View 1800 is a top view of base unit 1700 of FIG. 17. Surface 1802 is visible in view 1800. Surface 1802 is positioned between first edge 1702 and second edge 1704. Surface 1802 is substantially planar.

When base unit 1700 is joined to other base units to form a foldable dolly system, surface 1802 forms a portion of a holding surface. Base unit 1700 is connected to any desirable quantity of interconnectable base units to form the foldable dolly system.

Figure 19:
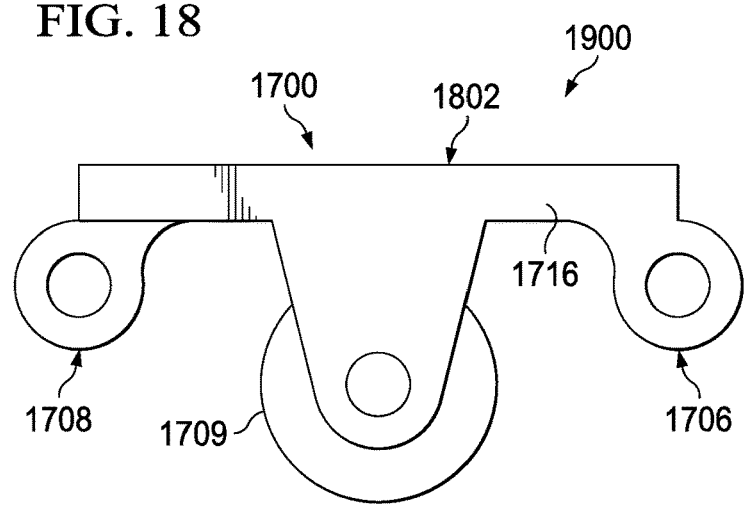
FIG. 19 is an illustration of a side view of a base unit of a folding dolly system in accordance with an illustrative embodiment.

Turning now to FIG. 19, an illustration of a side view of a base unit of a folding dolly system is depicted in accordance with an illustrative embodiment. Side view 1900 is a side view of base unit 1700. Side view 1900 is a view of fourth edge 1716. Fourth edge 1716 is substantially planar and substantially perpendicular to surface 1802.

Figure 20:
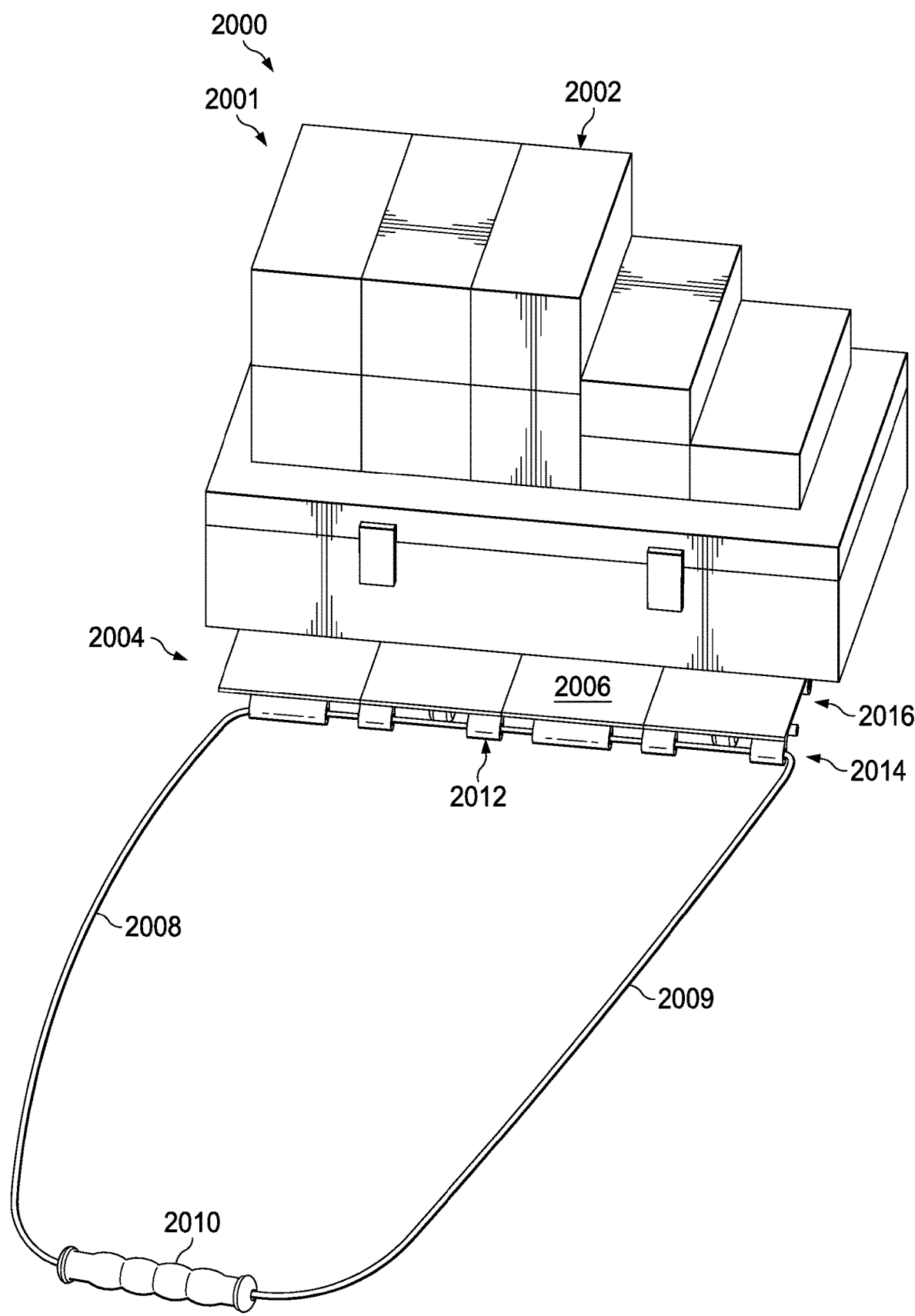
FIG. 20 is an illustration of a top perspective view of a folding dolly system with a handle in accordance with an illustrative embodiment.

Turning now to FIG. 20, an illustration of a top perspective view of a folding dolly system with a handle is depicted in accordance with an illustrative embodiment. Transportation environment 2000 is an implementation of transportation environment 100 of FIG. 1. In view 2001, cargo 2002 is being transported within transportation environment 2000 by propelling folding dolly system 2004. Cargo 2002 rests on holding surface 2006 of folding dolly system 2004.

Folding dolly system 2004 is a physical implementation of folding dolly system 102 of FIG. 1. In some illustrative examples, folding dolly system 2004 is the same as one of folding dolly system 200 of FIG. 2 or folding dolly system 1100 of FIG. 11.

As depicted, folding dolly system 2004 is propelled by pulling on handle 2008 connected to folding dolly system 2004. Handle 2008 takes the form of cord 2009 and grip 2010. Grip 2010 takes any desirable form to provide a location for an operator to hold. In some illustrative examples, grip 2010 is not present.

Cord 2009 extends through knuckles 2012 on edge 2014 of folding dolly system 2004. Knuckles 2012 are knuckles of at least a portion of plurality of interconnectable base units 2016 of folding dolly system 2004. In some other illustrative examples, cord 2009 extends through a portion of knuckles 2012 on edge 2014.

In some illustrative examples, handle 2104 takes a form other than cord 2009. In some illustrative examples, handle 2008 takes the form of a rigid stem and handle connected to at least one knuckle of knuckles 2012.

Figure 21:
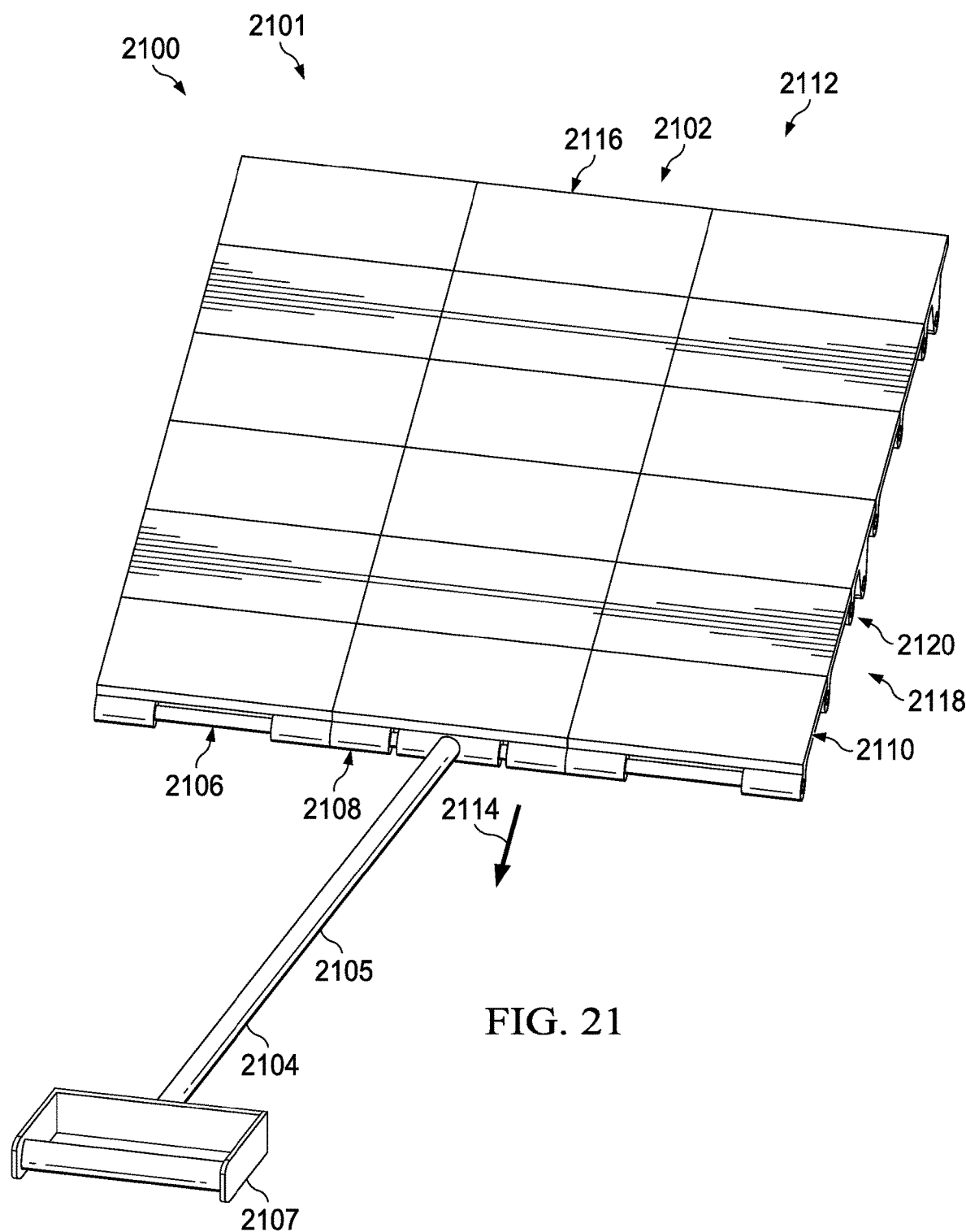
FIG. 21 is an illustration of a top perspective view of a folding dolly system with a handle in accordance with an illustrative embodiment.

Turning now to FIG. 21, an illustration of a top perspective view of a folding dolly system with a handle is depicted in accordance with an illustrative embodiment. Transportation environment 2100 is an implementation of transportation environment 100 of FIG. 1. In view 2101, folding dolly system 2102 is present within transportation environment 2100.

Folding dolly system 2102 is a physical implementation of folding dolly system 102 of FIG. 1. In some illustrative examples, folding dolly system 2102 is the same as folding dolly system 1100 of FIG. 11.

As depicted, folding dolly system 2102 is propelled by pulling on handle 2104 connected to folding dolly system 2102. Handle 2104 takes the form of rigid stem 2105 and grip 2107 connected to at least one knuckle of knuckles 2108.

As depicted, pin 2106 extends through knuckles 2108 on edge 2110 of folding dolly system 2102. Knuckles 2108 are knuckles of at least a portion of plurality of interconnectable base units 2112 of folding dolly system 2102. In this illustrative example, handle 2104 is connected to pin 2106. In some other non-depicted illustrative examples, pin 2106 is not present and handle 2104 is connected in an alternative method to at least one knuckle of edge 2110. In some illustrative examples, handle 2104 takes a form other than rigid stem 2105 and grip 2107. In some non-depicted examples, handle 2104 is a cord connected to at least one knuckle of knuckles 2108.

Folding dolly system 2102 is propelled in direction 2114 by pulling on handle 2104 connected to folding dolly system 2102. Interconnectable base units 2112 of folding dolly system 2102 are arranged in array 2116 having plurality of rows 2118 jointed by plurality of joints 2120. Plurality of joints 2120 is substantially perpendicular to direction 2114 of movement of folding dolly system 2102. By plurality of joints 2120 being substantially perpendicular to direction 2114 of movement, folding dolly system 2102 can travel across bumps, ramps, dips, or other ground variations in a serpentine fashion. When moving in a serpentine fashion, each row of plurality of rows 2118 moves up or down relative to an adjacent row when encountering a variation in the ground.

Figure 22:
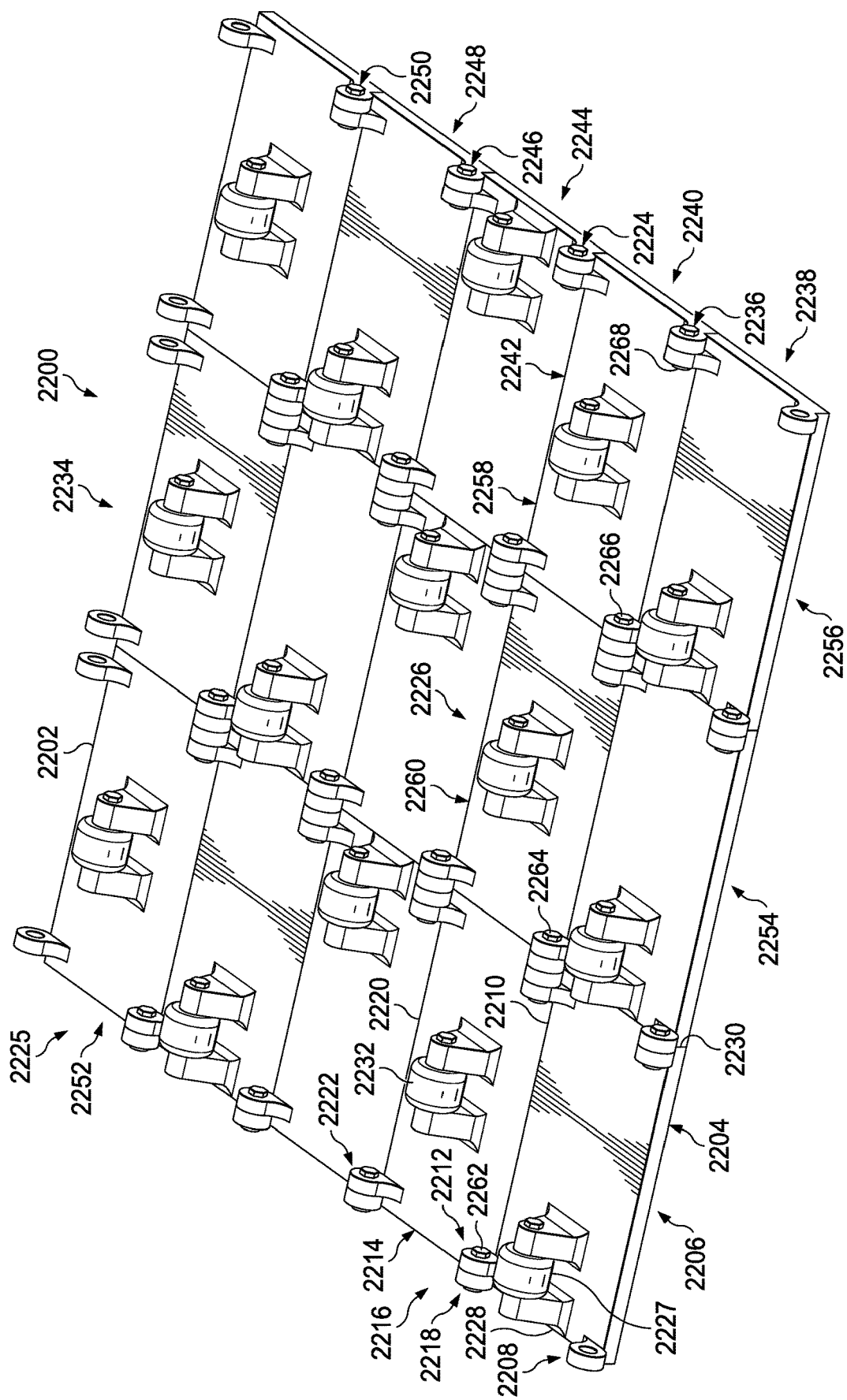
FIG. 22 is an illustration of a bottom view of a folding dolly system in accordance with an illustrative embodiment.

Turning now to FIG. 22, an illustration of a bottom view of a folding dolly system is depicted in accordance with an illustrative embodiment. Folding dolly system 2200 is a physical implementation of folding dolly system 102 of FIG. 1. Folding dolly system 2200 comprises plurality of interconnectable base units 2202 connected to form a substantially planar holding surface. Each base unit of plurality of interconnectable base units 2202 comprises a first edge with a number of knuckles configured to form a joint, a second edge with a number of knuckles configured to form a joint, and a surface forming a portion of the holding surface.

For example, base unit 2204 comprises first edge 2206 with number of knuckles 2208, second edge 2210 with number of knuckles 2212, and a surface (not depicted). As another example, base unit 2214 comprises first edge 2216 with number of knuckles 2218, second edge 2220 with number of knuckles 2222, and a surface (not depicted).

Plurality of interconnectable base units 2202 is connected by plurality of joints 2224. Each joint of plurality of joints 2224 is formed by a number of connectors. The number of connections comprises at least one of a number of shoulder bolts or a pin.

Folding dolly system 2200 is configured to fold into plurality of rows 2225 around an axis. Plurality of rows 2225 is connected by plurality of joints 2224. Each row of plurality of rows 2225 rotates about a joint of plurality of joints 2224.

Folding dolly system 2200 is one non-limiting example of folding dolly system 102 of FIG. 1. Folding dolly system 2200 has a different design than folding dolly system 200 of FIG. 2. Folding dolly system 2200 has a different quantity of rows in plurality of rows 2225 than the quantity of rows of plurality of rows 242 of FIG. 2.

Additionally, each base unit of plurality of interconnectable base units 2202 has a different design than the base units of plurality of interconnectable base units 202 of FIG. 2.

Folding dolly system 2200 comprises plurality of wheels 2226 connected to plurality of interconnectable base units 2202. As depicted, plurality of wheels 2226 is mounted on small bearings. The bearings provide a smooth rolling action for plurality of wheels 2226.

As depicted, each base unit of plurality of interconnectable base units 2202 is connected to at least one wheel of plurality of wheels 2226. For example, base unit 2204 is connected to wheel 2227 of plurality of wheels 2226. As depicted, wheel 2227 is not centered on base unit 2204. Wheel 2227 is positioned closer to third edge 2228 of base unit 2204 than fourth edge 2230 of base unit 2204.

Base unit 2214 is connected to wheel 2232 of plurality of wheels 2226. As depicted, wheel 2232 is centered on base unit 2214. Wheel 2232 is positioned substantially equidistance from third edge 2236 and fourth edge 2234 of base unit 2204.

In folding dolly system 2200 plurality of interconnectable base units 2202 are organized in plurality of rows 2225 and plurality of columns 2234. In folding dolly system 2200, each row of plurality of rows 2225 comprises a plurality of base units with wheels in substantially the same position. In folding dolly system 2200, each column of plurality of columns 2234 has a plurality of different wheel positions.

Plurality of joints 2224 connects plurality of rows 2225. For example, joint 2236 connects row 2238 and row 2240 of plurality of rows 2225. Row 2238 includes base unit 2204. Row 2240 includes base unit 2214. Joint 2236 connects base unit 2204 and base unit 2214.

Row 2240 is connected by joint 2242 to row 2244. Row 2244 is connected by joint 2246 to row 2248. Row 2248 is connected by joint 2250 to row 2252.

Folding dolly system 2200 is configured to fold into plurality of rows 2225 around an axis. Plurality of rows 2225 is connected by plurality of joints 2224. Each row of plurality of rows 2225 rotates about a joint of plurality of joints 2224.

Row 2238 rotates about joint 2236 relative to row 2240. Row 2240 rotates about joint 2236 relative to row 2238. Row 2240 rotates about joint 2242 relative to row 2244.

Plurality of joints 2224 is formed using at least one of a pin or a shoulder bolt. As depicted, each of plurality of joints 2224 is formed using a number of should bolts. For example, joint 2236 is formed by a number of shoulder bolts. Joint 2236 is formed by shoulder bolt 2262, shoulder bolt 2264, shoulder bolt 2266, and shoulder bolt 2268. Joint 2236 includes knuckles of each of base unit 2204, base unit 2254, base unit 2256, base unit 2258, base unit 2260, and base unit 2214. Shoulder bolt 2262 extends through knuckles of base unit 2204 and base unit 2214. Shoulder bolt 2264 extends through knuckles of base unit 2204, base unit 2214, base unit 2254, and base unit 2260. Shoulder bolt 2266 extends through knuckles of base unit 2254, base unit 2256, base unit 2258, and base unit 2260. Shoulder bolt 2268 extends through knuckles of base unit 2256 and base unit 2258.

By using shoulder bolts in plurality of joints 2224, any desirable quantity of base units can be added to a joint. By using shoulder bolts in plurality of joints 2224, pins of different lengths are not stored. By using shoulder bolts in plurality of joints 2224, the size and layout of folding dolly system 2200 can be changed without exchanging different lengths of pins. Using shoulder bolts in plurality of joints 2224 provides a flexibility of size and layout of folding dolly system 2200.

Figure 23:
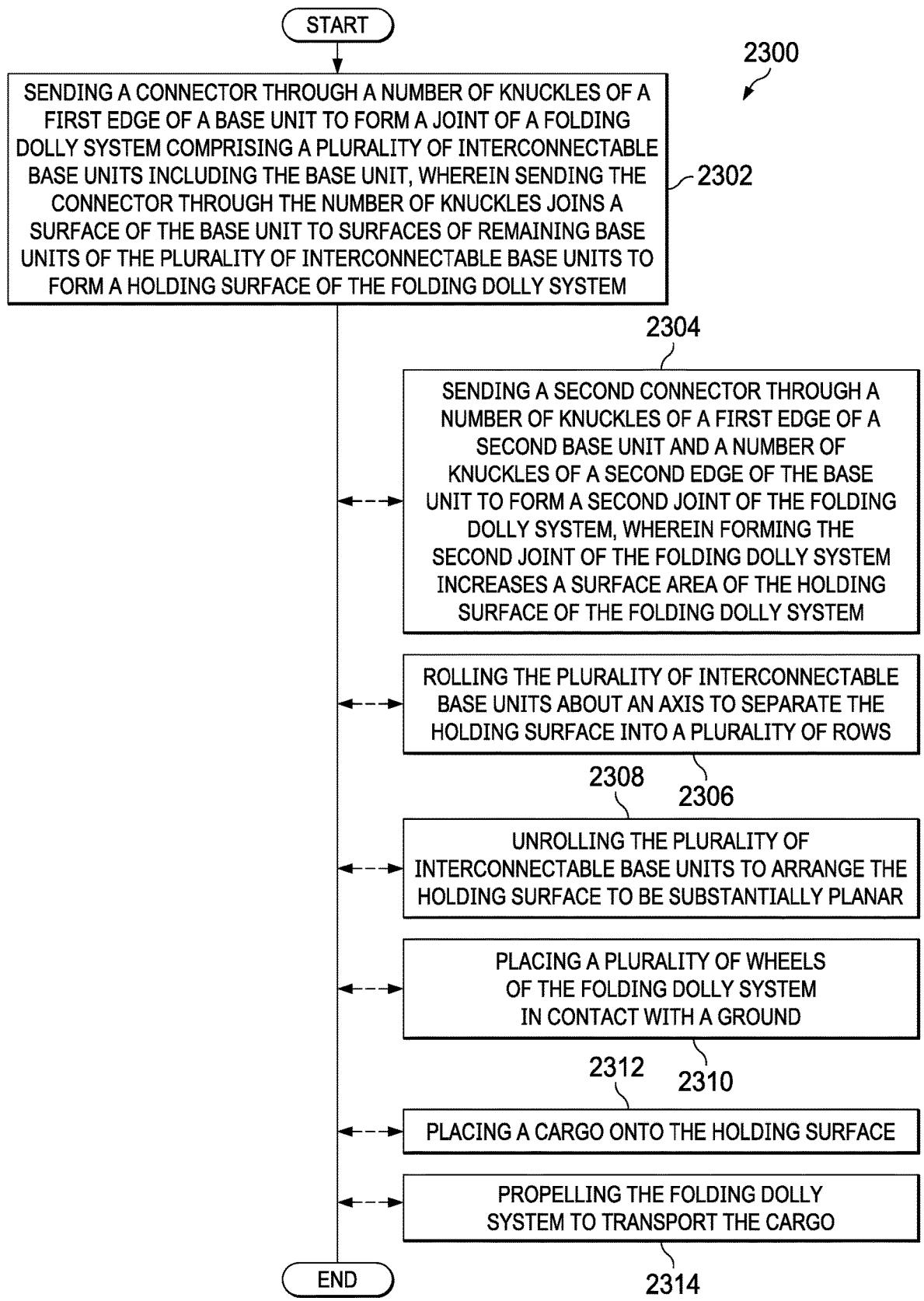
FIG. 23 is an illustration of a flowchart of a method of forming and using a folding dolly system in accordance with an illustrative embodiment.

Turning now to FIG. 23, an illustration of a flowchart of a method of forming and using a folding dolly system is depicted in accordance with an illustrative embodiment. In one illustrative example, method 2300 is utilized in transportation environment 100 of FIG. 1. In one illustrative example, method 2300 is utilized to form folding dolly system 200 of FIGS. 2-7. In one illustrative example, base unit 800 of FIGS. 8-10 is used in performing method 2300. In one illustrative example, method 2300 is utilized to form folding dolly system 1100 of FIGS. 11-16. In one illustrative example, base unit 1700 of FIGS. 17-19 is used in performing method 2300. In one illustrative example, method 2300 is utilized to form folding dolly system 2004 of FIG. 20. In one illustrative example, method 2300 is utilized to form folding dolly system 2102 of FIG. 21. In one illustrative example, method 2300 is utilized to form folding dolly system 2202 of FIG. 22.

Method 2300 sends a connector through a number of knuckles of a first edge of a base unit to form a joint of a folding dolly system comprising a plurality of interconnectable base units including the base unit, wherein sending the connector through the number of knuckles joins a surface of the base unit to surfaces of remaining base units of the plurality of interconnectable base units to form a holding surface of the folding dolly system (operation 2302). Afterwards, method 2300 terminates.

In some illustrative examples, method 2300 sends a second connector through a number of knuckles of a first edge of a second base unit and a number of knuckles of a second edge of the base unit to form a second joint of the folding dolly system, wherein forming a second joint of the folding dolly system increases a surface area of the holding surface of the folding dolly system (operation 2304). By forming additional joints, additional interconnectable base units are joined to the folding dolly system and the holding surface increases. By removing base units from the folding dolly system, the holding surface decreases. Using the plurality of interconnectable base units, folding dolly system provides a holding surface having an adjustable shape and size.

In some illustrative examples, method 2300 rolls the plurality of interconnectable base units about an axis to separate the holding surface into a plurality of rows (operation 2306). In some illustrative examples, method 2300 unrolls the plurality of interconnectable base units to arrange the holding surface to be substantially planar (operation 2308).

In some illustrative examples, method 2300 places a plurality of wheels of the folding dolly system in contact with a ground (operation 2310). In some illustrative examples, method 2300 places a cargo onto the holding surface (operation 2312). When a cargo is placed on the holding surface, the plurality of interconnectable base units react against each other to keep the holding surface substantially planar. When a cargo is placed on the holding surface, the plurality of interconnectable base units react against each other to prevent collapse of the holding surface.

In some illustrative examples, method 2300 propels the folding dolly system to transport the cargo (operation 2314). The folding dolly system is propelled by any desirable process. In some illustrative examples, the folding dolly system is pulled by a handle connected to the folding dolly system. The handle takes any desirable form and can be removeable or replaceable. In some illustrative examples, the handle is a flexible cord and acts as a securing strap in a stored position.

Figure 24:
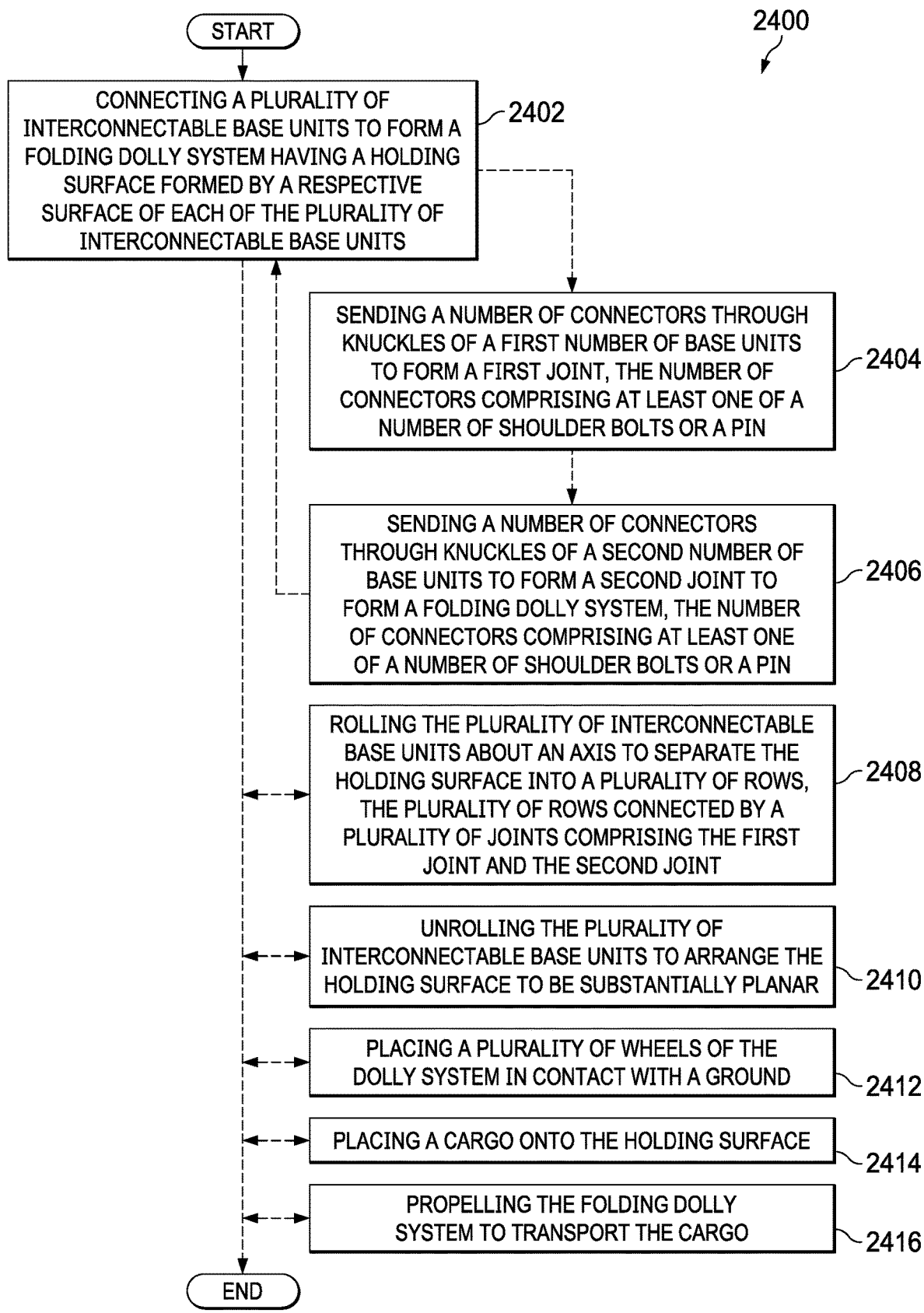
FIG. 24 is an illustration of a flowchart of a method of forming and using a folding dolly system in accordance with an illustrative embodiment.

Turning now to FIG. 24, an illustration of a flowchart of a method of forming and using a folding dolly system is depicted in accordance with an illustrative embodiment. In one illustrative example, method 2400 is utilized in transportation environment 100 of FIG. 1. In one illustrative example, method 2400 is utilized to form folding dolly system 200 of FIGS. 2-7. In one illustrative example, base unit 800 of FIGS. 8-10 is used in performing method 2400. In one illustrative example, method 2400 is utilized to form folding dolly system 1100 of FIGS. 11-16. In one illustrative example, base unit 1700 of FIGS. 17-19 is used in performing method 2400. In one illustrative example, method 2400 is utilized to form folding dolly system 2004 of FIG. 20. In one illustrative example, method 2400 is utilized to form folding dolly system 2102 of FIG. 21. In one illustrative example, method 2400 is utilized to form folding dolly system 2202 of FIG. 22.

Method 2400 connects a plurality of interconnectable base units to form a folding dolly system having a holding surface formed by a respective surface of each of the plurality of interconnectable base units (operation 2402). Afterwards, method 2400 terminates.

In some illustrative examples of method 2400, connecting the plurality of interconnectable base units comprises sending a number of connectors through knuckles of a first number of base units to form a first joint, the number of connectors comprising at least one of a number of shoulder bolts or a pin (operation 2404), and sending a number of connectors through knuckles of a second number of base units to form a second joint to form a folding dolly system, the number of connectors comprising at least one of a number of shoulder bolts or a pin (operation 2406). When a number of shoulder bolts is used, each shoulder bolt can restrain a base unit relative to an adjacent base unit. In some illustrative examples, when a pin is used, the pin extends through a plurality of base units. In some illustrative examples, when the number of connectors includes a pin, the pin is the same length as a length of a joint.

In some illustrative examples, method 2400 rolls the plurality of interconnectable base units about an axis to separate the holding surface into a plurality of rows, the plurality of rows connected by a plurality of joints comprising the first joint and the second joint (operation 2408). Rolling the plurality of interconnectable base units about an axis causes each of the plurality of rows to rotate about at least one respective joint.

In some illustrative examples, method 2400 unrolls the plurality of interconnectable base units to arrange the holding surface to be substantially planar (operation 2410), and places a plurality of wheels of the folding dolly system in contact with a ground (operation 2412). In some illustrative examples, method 2400 places a cargo onto the holding surface (operation 2414). When a cargo is placed on the holding surface, the plurality of interconnectable base units react against each other to keep the holding surface substantially planar. When a cargo is placed on the holding surface, the plurality of interconnectable base units react against each other to prevent collapse of the holding surface.

In some illustrative examples, method 2400 propels the folding dolly system to transport the cargo (operation 2416). The folding dolly system is propelled by any desirable process. In some illustrative examples, the folding dolly system is pulled by a handle connected to the folding dolly system. The handle takes any desirable form and can be removeable or replaceable. In some illustrative examples, the handle is a flexible cord and acts as a securing strap in a stored position.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 2302 through operation 2314 may be optional. In another example, operation 2404 through operation 2416 may be optional.

The illustrative examples provide a foldable dolly system that is at least one of smaller, lighter, or less expensive than conventional material transport devices. The illustrative examples provide a foldable dolly system that can be transferred between a deployed position and a stored position for more compact storage. The illustrative examples provide a foldable dolly system that has a holding surface that is adjustable by adding or removing a number of interconnectable base units. A plurality of interconnectable base units forming the foldable dolly system react against each other to maintain the holding surface in a substantially planar shape. The plurality of interconnectable base units forming the foldable dolly system react against each other to prevent collapse of the holding surface under weight of cargo.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A folding dolly system comprising:
    a plurality of interconnectable base units connected to form a substantially planar holding surface, each base unit comprising a first edge with a number of knuckles configured to form a joint, a second edge with a second number of knuckles configured to form a joint, and a surface forming a portion of the holding surface, wherein the number of knuckles and the second number of knuckles of each base unit are connected to a bottom of the base unit such that the number of knuckles and the second number of knuckles are each positioned beneath the surface of the base unit and beneath the bottom of the base unit; and
    a plurality of wheels connected to the plurality of interconnectable base units.

2. The folding dolly system of claim 1, wherein the plurality of interconnectable base units is connected by a plurality of joints, and wherein each joint of the plurality of joints is formed by a number of connectors.

3. The folding dolly system of claim 2, wherein the number of connectors comprises at least one of a number of shoulder bolts or a pin.

4. The folding dolly system of claim 2, wherein the folding dolly system is configured to fold into a plurality of rows around an axis, the plurality of rows connected by the plurality of joints.

5. The folding dolly system of claim 4, wherein the plurality of rows is configured to move relative to each other about the plurality of joints to move the folding dolly system between a stored position and a deployed position, wherein the folding dolly system forms the substantially planar holding surface in the deployed position, and wherein the plurality of rows comprises a plurality of surfaces wrapping around the axis in the stored position, wherein the plurality of surfaces is configured to join to form the substantially planar holding surface in the deployed position.

6. The folding dolly system of claim 1, wherein each base unit is connected to at least one wheel of the plurality of wheels.

7. The folding dolly system of claim 6, wherein each base unit has a same design including a location of a connection to a wheel of the plurality of wheels.

8. The folding dolly system of claim 1, wherein the first edge and second edge of each base unit is configured to react against a respective first edge or second edge of an adjacent base unit to form the holding surface to be substantially planar.

9. The folding dolly system of claim 1, wherein each base unit of the plurality of interconnectable base units comprises a third edge and a fourth edge, wherein each third edge and each fourth edge of a respective base unit are each substantially planar and substantially perpendicular to the surface of the respective base unit.

10. The folding dolly system of claim 1 further comprising:
    a handle connected to at least one base unit of the plurality of interconnectable base units.

11. A method comprising:
    sending a connector through a number of knuckles of a first edge of a base unit to form a joint of a folding dolly system comprising a plurality of interconnectable base units including the base unit, wherein the number of knuckles is connected to a bottom of the base unit such that the number of knuckles is positioned beneath a surface of the base unit and beneath the bottom of the base unit, wherein sending the connector through the number of knuckles joins the surface of the base unit to surfaces of remaining base units of the plurality of interconnectable base units to form the folding dolly system, wherein the folding dolly system comprises: a holding surface formed by a respective surface of each of the plurality of interconnectable base units, a plurality of joints connecting the plurality of interconnectable base units into a plurality of rows rotatably connected by the plurality of joints, and a plurality of wheels connected to the plurality of interconnectable base units, wherein the folding dolly system is configured to fold into the plurality of rows around an axis.

12. The method of claim 11 further comprising:
    rolling the plurality of interconnectable base units about the axis to separate the holding surface into the plurality of rows.

13. The method of claim 11 further comprising:
    unrolling the plurality of interconnectable base units to arrange the holding surface to be substantially planar.

14. The method of claim 13 further comprising:
    placing the plurality of wheels of the folding dolly system in contact with a ground;
    placing a cargo onto the holding surface; and
    propelling the folding dolly system to transport the cargo.

15. The method of claim 11 further comprising:
    sending a second connector through a number of knuckles of a first edge of a second base unit and a number of knuckles of a second edge of the base unit to form a second joint of the folding dolly system, wherein forming the second joint of the folding dolly system increases a surface area of the holding surface of the folding dolly system.

16. A base unit for a folding dolly system, the base unit comprising:

a first edge having a number of knuckles for forming a joint, wherein each of the number of knuckles is configured to receive a number of connectors, and wherein each of the number of knuckles is connected to a bottom of the base unit such that each of the number of knuckles is positioned beneath a surface of the base unit and beneath the bottom of the base unit;

a second edge having a second number of knuckles for forming a joint, wherein each of the second number of knuckles is configured to receive a number of connectors, and wherein each of the second number of knuckles is connected to a bottom of the base unit such that each of the second number of knuckles is positioned beneath a surface of the base unit and beneath the bottom of the base unit; and the surface between the first edge and the second edge, the surface is substantially planar.

17. The base unit of claim 16 further comprising:
a wheel connected to a bottom of the base unit.

18. The base unit of claim 16, wherein a remainder of the first edge is configured to react against a second base unit to provide a substantially planar holding surface of the folding dolly system, the second base unit forming the joint with the number of knuckles.

19. The base unit of claim 16, wherein the number of knuckles of the first edge is configured to support a remainder of a second edge of a second base unit to provide a substantially planar holding surface of the folding dolly system.

20. The base unit of claim 16, wherein a third edge and a fourth edge of the base unit are each substantially planar and substantially perpendicular to the surface.

21. A method comprising:
connecting a plurality of interconnectable base units to form a folding dolly system having a holding surface formed by a respective surface of each of the plurality of interconnectable base units, a plurality of joints connecting the plurality of interconnectable base units into a plurality of rows rotatably connected by the plurality of joints, and a plurality of wheels connected to the plurality of interconnectable base units, wherein the folding dolly system is configured to fold into the plurality of rows around an axis, wherein connecting the plurality of interconnectable base units comprises:
sending a number of connectors through knuckles of a first number of base units to form a first joint of the plurality of joints, the number of connectors comprising at least one of a number of shoulder bolts or a pin, and wherein each of the knuckles is connected to a bottom of a respective base unit of the first number of base units such that each of the knuckles is positioned beneath a surface of the respective base unit and beneath the bottom of the respective base unit; and sending a second number of connectors through knuckles of a second number of base units to form a second joint of the plurality of joints to form the folding dolly system, the second number of connectors comprising at least one of a number of shoulder bolts or a pin, and wherein each of the knuckles is connected to a bottom of a respective base unit of the second number of base units such that each of the knuckles is positioned beneath a surface of the respective base unit and beneath the bottom of the respective base unit.

22. The method of claim 21 further comprising:
rolling the plurality of interconnectable base units about an axis to separate the holding surface into a plurality of rows, the plurality of rows connected by a plurality of joints comprising the first joint and the second joint.

23. The method of claim 22 further comprising:
unrolling the plurality of interconnectable base units to arrange the holding surface to be substantially planar;
placing a plurality of wheels of the folding dolly system in contact with a ground;
placing a cargo onto the holding surface; and
propelling the folding dolly system to transport the cargo.

* * * * *